(12) United States Patent
Komuro et al.

(10) Patent No.: US 7,972,450 B2
(45) Date of Patent: *Jul. 5, 2011

(54) HIGH RESISTANCE MAGNET AND MOTOR USING THE SAME

(75) Inventors: Matahiro Komuro, Hitachi (JP); Yuichi Satsu, Hitachi (JP); Takao Imagawa, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/708,580

(22) Filed: Feb. 19, 2010

(65) Prior Publication Data

US 2010/0141367 A1 Jun. 10, 2010

Related U.S. Application Data

(63) Continuation of application No. 11/838,266, filed on Aug. 14, 2007, now Pat. No. 7,696,662.

(30) Foreign Application Priority Data

Aug. 30, 2006 (JP) ................................ 2006-232989

(51) Int. Cl.
| | |
|---|---|
| H01F 1/00 | (2006.01) |
| H02K 1/27 | (2006.01) |
| H02K 1/06 | (2006.01) |
| H02K 5/10 | (2006.01) |
| H02K 21/12 | (2006.01) |
| H02K 3/48 | (2006.01) |
| H02K 1/12 | (2006.01) |

(52) U.S. Cl. .............. 148/302; 310/44; 310/45; 310/54; 310/154.46; 310/156.33; 310/154.35; 310/88; 310/186; 310/271; 310/156.01; 219/83; 219/121.72; 219/71; 219/82; 29/759; 409/165; 409/166; 409/167; 409/168; 75/244; 419/12; 252/62.55

(58) Field of Classification Search .................... 310/12, 310/44, 45, 54, 156.01, 218, 154.46, 156.51, 310/156.33, 154.35, 88, 271, 186, 216; 219/212.67, 219/121.72, 71, 82, 83; 29/759; 409/165–168, 409/235; 75/244; 419/12; 252/62.55; 148/302; H02K 5/10, 21/12, 3/48, 1/02, 1/27, 1/06

See application file for complete search history.

(56) References Cited

U.S. PATENT DOCUMENTS 3,844,849 A * 10/1974 Kuroda .......................... 148/310
(Continued)

FOREIGN PATENT DOCUMENTS

JP 06-244011 9/1994
(Continued)

OTHER PUBLICATIONS

Steven Watkins, "3-D Crystal Lattice Images", May 4, 2001, Luisiana State University.*

(Continued)

*Primary Examiner* — Quyen Leung
*Assistant Examiner* — John K Kim
(74) *Attorney, Agent, or Firm* — Antonelli, Terry, Stout & Kraus, LLP.

(57) ABSTRACT

A magnet comprising grains of a ferromagnetic material whose main component is iron and a fluorine compound layer or an oxy-fluorine compound layer of fluoride compound particles of alkali metals, alkaline earth metals and rare earth elements, present on the surface of the ferromagnetic material grains, wherein an amount of iron atoms in the fluorine compound particles is 1 to 50 atomic %.

25 Claims, 7 Drawing Sheets

U.S. PATENT DOCUMENTS

| | | | | |
|---|---|---|---|---|
| 4,601,765 A * | 7/1986 | Soileau et al. | | 148/104 |
| 4,896,869 A * | 1/1990 | Takekoshi | | 269/60 |
| 5,059,337 A * | 10/1991 | Maro et al. | | 252/62.54 |
| 5,063,011 A * | 11/1991 | Rutz et al. | | 264/126 |
| 5,167,914 A * | 12/1992 | Fujimura et al. | | 419/11 |
| 5,939,808 A * | 8/1999 | Adames | | 310/89 |
| 6,281,774 B1 | 8/2001 | Nishiuchi et al. | | |
| 6,303,218 B1 | 10/2001 | Kamiguchi et al. | | |
| 6,511,552 B1 * | 1/2003 | Makita et al. | | 148/302 |
| 6,765,144 B1 * | 7/2004 | Wang et al. | | 174/36 |
| 6,779,278 B1 * | 8/2004 | Spady et al. | | 33/569 |
| 6,838,798 B2 * | 1/2005 | Takahata et al. | | 310/156.53 |
| 7,105,956 B2 * | 9/2006 | Botos et al. | | 310/12.06 |
| 7,214,427 B2 * | 5/2007 | Huang et al. | | 428/402 |
| 7,301,733 B1 * | 11/2007 | Fukuzawa et al. | | 360/324.1 |
| 7,696,662 B2 * | 4/2010 | Komuro et al. | | 310/156.01 |
| 2002/0015140 A1 * | 2/2002 | Yoda | | 355/53 |
| 2003/0136469 A1 * | 7/2003 | Makita et al. | | 148/105 |
| 2003/0155548 A1 * | 8/2003 | Ozawa et al. | | 252/62.51 R |
| 2003/0172995 A1 * | 9/2003 | Makita et al. | | 148/101 |
| 2004/0117109 A1 * | 6/2004 | Kodani et al. | | 701/200 |
| 2004/0246634 A1 * | 12/2004 | Yuasa et al. | | 360/324.11 |
| 2005/0157433 A1 * | 7/2005 | Kamiguchi et al. | | 360/324.1 |
| 2005/0183791 A1 * | 8/2005 | Hidaka et al. | | 148/103 |
| 2005/0236910 A1 * | 10/2005 | Botos et al. | | 310/12 |
| 2005/0284545 A1 * | 12/2005 | Komuro et al. | | 148/302 |
| 2006/0071287 A1 | 4/2006 | Yuasa et al. | | |
| 2006/0108890 A1 * | 5/2006 | Hauger et al. | | 310/214 |
| 2006/0191601 A1 * | 8/2006 | Komuro et al. | | 148/302 |
| 2007/0256809 A1 | 11/2007 | Harada et al. | | |
| 2010/0141367 A1 * | 6/2010 | Komuro et al. | | 335/302 |

FOREIGN PATENT DOCUMENTS

| | | |
|---|---|---|
| JP | 2006-041203 | 2/2006 |
| JP | 2006-066853 | 3/2006 |

OTHER PUBLICATIONS

Partial translation of Japanese office action of application No. 2006/232989.

* cited by examiner

100nm

100nm (1)

(2)

(3)

(1)

(2)

(3)

(4)

(5)

HIGH RESISTANCE MAGNET AND MOTOR USING THE SAME

CROSS-REFERENCE TO RELATED APPLICATION

This application is a continuation application of U.S. application Ser. No. 11/838,266, filed Aug. 14, 2007 now U.S. Pat. No. 7,696,662, the contents of which are incorporated herein by reference.

Claim of Priority

The present application claims priority from Japanese application serial No. 2006-232989, filed on Aug. 30, 2006, the content of which is hereby incorporated by reference into this application.

DESCRIPTION OF THE INVENTION:

1. Field of the Invention

The present invention relates to a high resistance magnet, a method of manufacturing the magnet, a motor using the magnet and other applications of the magnet, and more particularly to a high resistance, high energy product magnet, a motor using the same and other applications thereof.

2. Related Art

In recent years, development of rare earth element magnets for magnet motors has been conducted. The following patent document No. 1 discloses rare earth element magnets with improved magnetic properties.

Patent document No. 1 discloses a rare earth element magnet with high coercive force and high residual magnetic flux density well balanced by forming grain boundaries of a lamellar structure layer containing fluorine compounds at grain boundaries of rare earth element magnet represented by Nd-Fe-B. A thickness and coverage of the lamellar fluorine compound layer has been investigated.

Patent document No. 1: Japanese patent laid-open 2006-066859

SUMMARY OF THE INVENTION

In the patent document No. 1, improvement of magnetic properties of the rare earth element magnet was realized by forming a lamellar fluorine compound layer at the grain boundaries thereof. However, coercive force, residual magnetic flux density, rectangularity of demagnetization curve, thermal demagnetization properties, anisotropy, corrosion resistance, etc are not satisfactory. It is an object of the present invention to provide a magnet having at least one of the improved properties above mentioned.

The present invention provides a magnet comprising grains of a ferromagnetic material whose main component is iron and a fluoride compound layer of fluoride compound particles of alkali metals, alkaline earth metals and rare earth elements, present on the surface of the ferromagnetic grains, wherein an amount of iron atoms in the fluorine compound particles is 1 to 50 atomic %.

DESCRIPTION OF THE INVENTION

Figure 1:
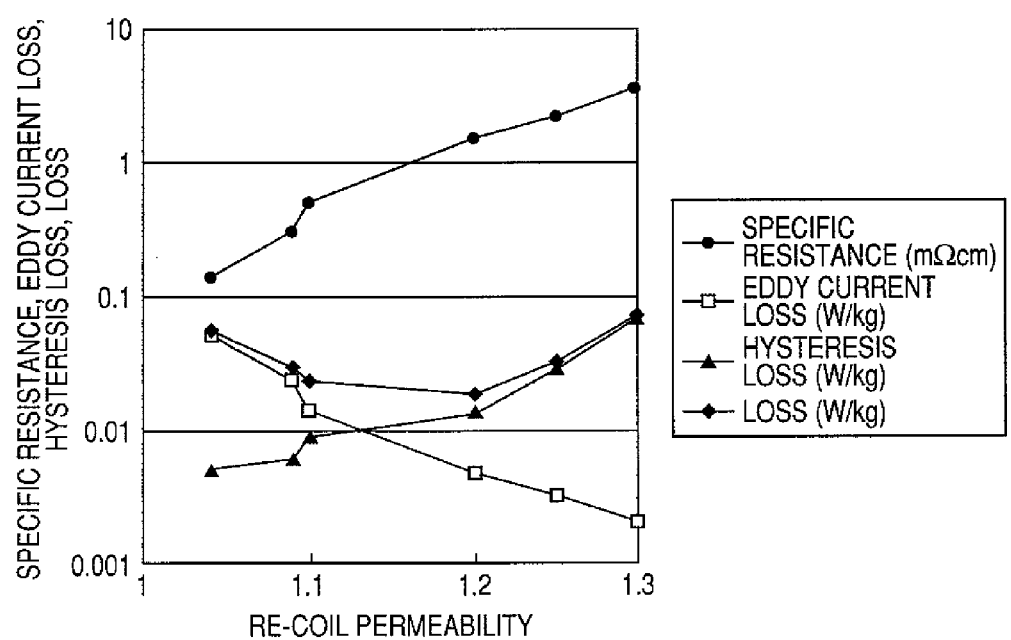
FIG. 1 is a graph showing relationships among re-coil permeability and other electric properties.
Figure 2A:
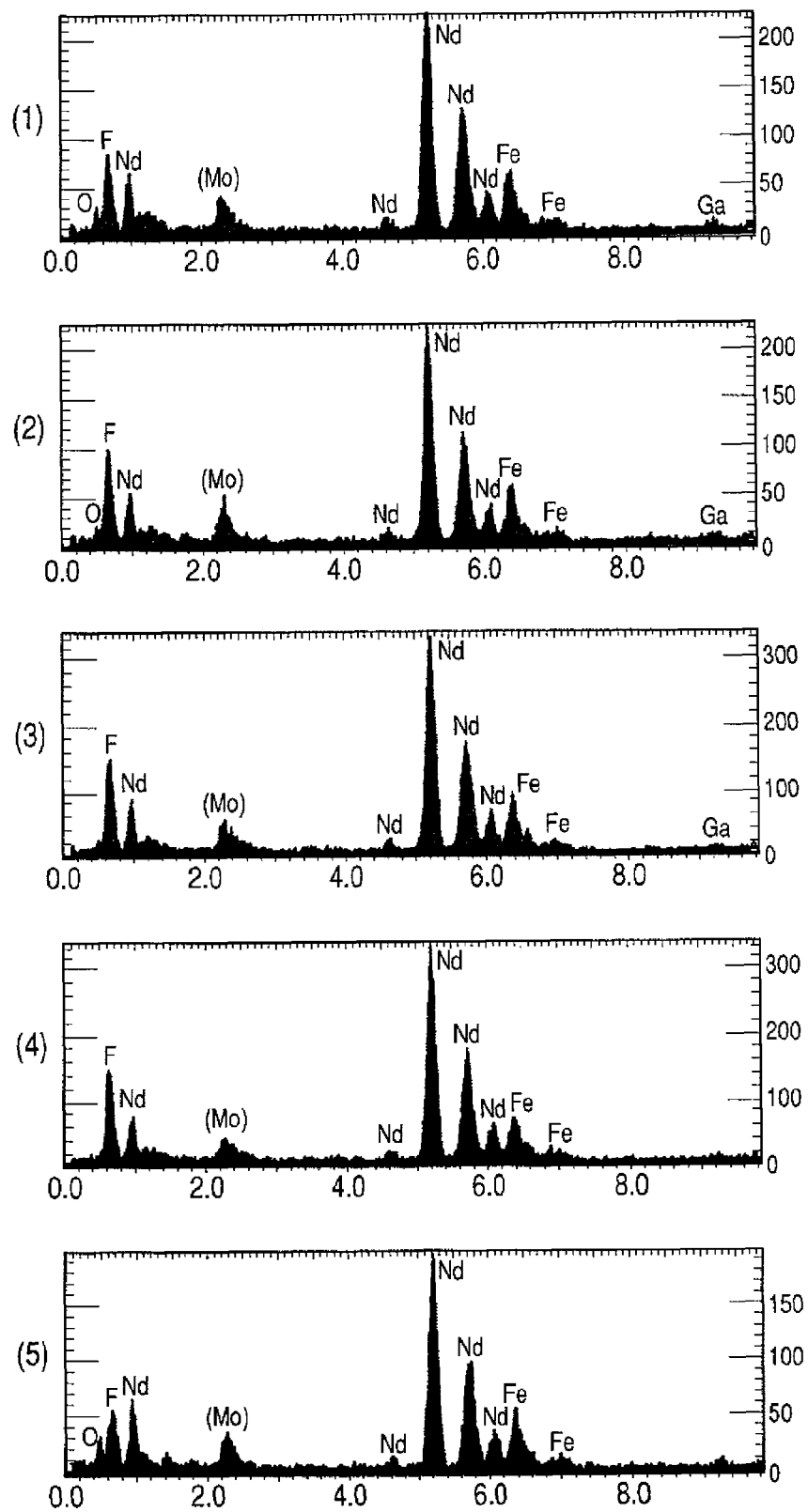
FIGS. 2(1) to 2(8) are spectra of fluorine compounds measured by XRD analysis.
Figure 2B:
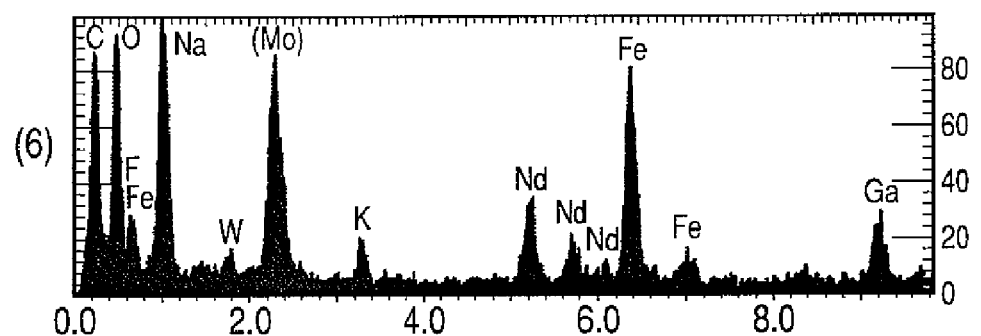
Figure 2B:
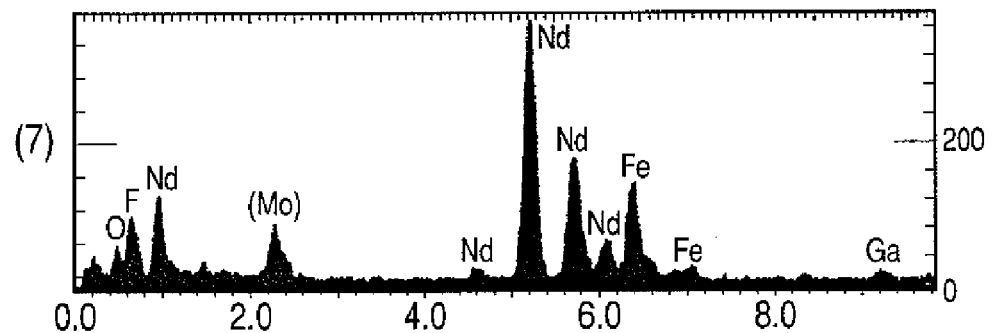
Figure 2B:
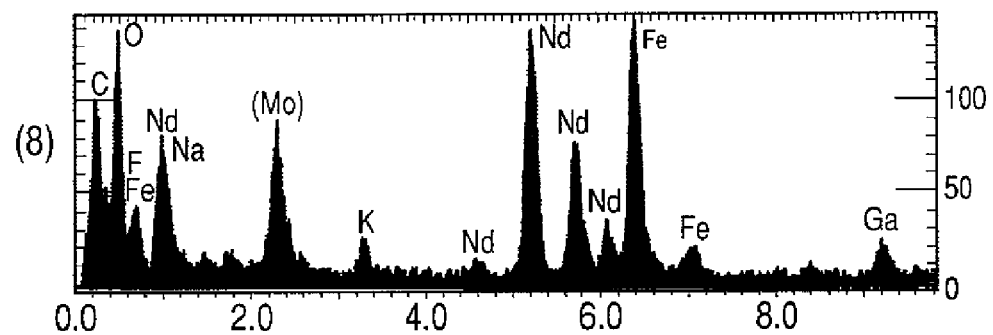

The iron maintains the crystal structure of the fluorine compound. The grains of the ferromagnetic material are ferromagnetic powder whose composition is represented by R-Fe-B wherein R is a rare earth element, Fe is iron and B is boron.

The particles of the fluorine compound are magnetic powder whose main component is at least one of $NdF_3$, $LiF$, $MgF_2$, $CaF_2$, $ScF_2$, $VF_2$, $VF_3$, $CrF_2$, $CrF_3$, $MnF_2$, $MnF_3$, $CoF_2$, $CoF_3$, $NiF_2$, $ZnF_2$, $AlF_3$, $GaF_3$, $SrF_2$, $YF_3$, $ZrF_3$, $NbF_5$, $AgF$, $InF_3$, $SnF_3$, $SnF_4$, $BaF_2$, $LaF_2$, $LaF_2$, $CeF_3$, $PrF_2$, $PrF_3$, $NdF_2$, $SmF_2$, $SmF_3$, $EuF_2$, $EuF_3$, $GdF_3$, $TbF_3$, $TbF_4$, $DyF_2$, $DyF_3$, $HoF_2$, $HoF_3$, $ErF_2$, $ErF_3$, $TmF_2$, $TmF_3$, $YbF_2$, $YbF_3$, $LuF_2$, $LuF_3$, $PbF_2$, and $BiF_3$.

The particles of the oxy-fluorine compound, which is usable in the present invention as the ferromagnetic material is magnetic powder whose main component is represented by $Rw(O_xF_y)_z$ wherein w,x,y are integers and R is at least one of Li, Mg, Ca, Sc, Mn, Co, Ni, Zn, Al, Ga, Sr, Y, Zr, Nb, Ag, In, Sn, Ba, La, Pr, Nd, Sm, Eu, Gd, Tb, Dy, Ho, Er, Tm, Yb, Lu, Pb and Bi.

The magnet according to claim 1, wherein an average particle size of the fluorine compound particles is 1 to 500 nm, and the fluorine compound particles have a higher electric resistance than the grains of the ferromagnetic material.

The magnet has a recoil magnetic permeability of larger than 1.04, but smaller than 1.30, and a specific resistance is 0.2 mΩcm or more. The fluorine compound covers the surface of the ferromagnetic material grains in a coverage of 50 to 100%.

The grains of the fluorine compound particles grow when subjected to molding under heating. The grains of the fluorine compound particles have an average crystal grain size of 1 to 500 nm.

In the following, the present invention will be explained in detail by reference to drawings.

In the present invention, typical examples of the fluorine compounds are fluorides of metal elements represented by $MF_n$ (M; metal element, F: fluorine, n: 1-4) and typical examples of oxy-fluorine compounds are oxy-fluorides of metal elements represented by $M(O)F_m$ (m: 1-4).

The present invention is featured by forming a plate or lamellar structure of a fluorine compound to thereby increase an interface between a main phase and the fluorine compound and making the fluorine compound to be a ferromagnetic phase.

As a method of forming the lamellar fluorine compound, there is a surface treatment. The surface treatment comprises a step of coating a fluorine compound and/or an oxy-fluorine compound containing at least one of alkali metals, alkaline earth metals and rare earth elements on the surface of the ferromagnetic powder. In this method, a gelatinous fluorine compound or oxy-fluorine compound is crushed in an alcoholic solvent and the solution is coated on the surface of the magnetic powder, followed by drying to remove the solvent.

The coating is heated at 200 to 400° C. to remove the solvent, and then heated at 500 to 800° C. to thereby diffuse oxygen, rare earth elements and elements constituting the fluorine compounds into the fluorine compound and the ferromagnetic powder. The ferromagnetic powder contains 10 to 5000 ppm of oxygen and light elements as impurities such as H, C, P, Si, Al, etc.

Oxygen contained in the ferromagnetic powder may be present as a phase containing oxygen in a mother phase or at grain boundaries in a composition displaced from stoichiometric relation as well as in the form of oxides of rare earth elements, Si, Al, etc. The oxygen containing phase make worse magnetization of the ferromagnetic powder, and gives influence on the magnetization curve. That is, this leads to decrease in residual magnetic flux density, anisotropic magnetic field, rectangularity of magnetization curve and coercive force and increase in irreversible demagnetization ratio and thermal demagnetization, and fluctuation of magnetization property, deterioration of corrosion resistance, lowering of mechanical properties, etc.

Since oxygen gives influences on various magnetic properties, it has been attempted to prevent oxygen from remaining in the ferromagnetic powder.

When the ferromagnetic powder having the fluorine compound layer is heated to 400° C. or higher, diffusion of iron into the fluorine compound takes place. Iron atoms in the ferromagnetic powder are contained as an intermetallic compound with rare earth elements. When iron atoms are heated, iron atoms diffuse into the fluorine compound layer. In forming the fluorine compound layer on the surface of the ferromagnetic powder, rare earth fluoride $REF_2$ or $REF_3$ where RE is a rare earth element is heated at 400° C. or lower to grow its crystal; then, the crystal is maintained in a vacuum of $1 \times 10^{-4}$ torr or less at 500 to 800° C. for 30 minutes. This heat treatment effects diffusion of iron atoms into the fluorine compounds and at the same time the rare earth elements in the ferromagnetic material powder into $REF_3$, $ReF_2$ or RE (OF), or grain boundaries of the compounds.

The fluorine compounds or oxy-fluorine compounds have a crystal structure of a face-centered cubic lattice; a lattice constant is from 0.54 to 0.60 nm. By controlling an amount of iron in the fluorine compounds and oxy-fluorine compounds, the residual magnetic flux density, anisotropy, corrosion resistance, etc can be remarkably improved.

In order to obtain a density of 90% or more at the time of molding under heating, the temperature for molding should be as high as 500 to 800° C. thereby to soften the mother phase. The molding at the temperature grows the crystal grains of fluorine compounds or oxy-fluorine compounds and diffusion between the ferromagnetic material powder and the fluorine compounds or oxy-fluorine compounds.

If the temperature exceeds 800° C., a soft magnetic material such as αFe, etc grows. Therefore, the molding under pressure is carried out at a preferable molding temperature lower than 800° C. If the formation of the soft magnetic material is controlled by adding various additive elements, a molding temperature higher than 800° C. may be acceptable. In case where the ferromagnetic material powder is NdFeB group, Nd, Fe, B or additive elements diffuse into fluorine compounds that grow by assistance of a grain boundary stress generated by the heating at 500° C. or higher under pressure. At the above temperature, a portion where a concentration of Fe is 1 atomic % (grain boundaries or defects) appears, though the concentration differs depending on locations. If the temperature is lower than 500° C., a high pressure is needed to deform hard NdFe powder, which needs a high price metal mold and shortens the life of the mold.

A driving force of diffusion is a temperature, stress (strain), concentration difference, defects, etc, the diffusion being observed by means of a microscope, for example. Although elements such as Nd, B, etc do not change greatly magnetic properties of the fluorine compounds, it is possible to keep constant the magnetic properties of the magnet by controlling a concentration of Fe because Fe atoms change the magnetic properties of the fluorine compounds based on its concentration. When a total concentration of elements other than B is 100%, and when a concentration of Fe is set to 50 atomic % or less, a structure of the fluorine compound can be maintained. If the Fe concentration exceeds 50 atomic %, an amorphous phase or an Fe main phase appears thereby to become a mixed phase with a small coercive force. Accordingly, the Fe concentration should be 50 atomic % or less.

The NdFeB magnetic material powder contains magnetic powder containing a phase equivalent to a crystal structure of $Nd_2Fe_{14}B$ in a mother phase. The mother phase may contain transition metals such as Al, Co, Cu, Ti, etc. A part of B may be replaced with C. Compounds such as $Fe_3B$ or $Nd_2Fe_{23}B_3$, etc or oxides may be contained in a layer other than the mother layer.

When the fluorine compound phase is formed in the $Sm_2Co_{17}$ magnetic powder, followed by heating and molding it, Co diffuses into the fluorine compound layer. When an amount of Co diffusion is large, Co in the fluorine compound becomes soft magnetic thereby to increase a loss. In order to reduce the loss, a Co concentration in the fluorine compound layer is lowered to 50 atomic % or less.

Since the fluorine compound layer exhibits resistance higher than that of NdFeB magnetic powder at 800° C. or lower, it is possible to increase resistance of the NdFeB sintered magnet by forming the fluorine compound layer so that the loss can be reduced. The fluorine compound layer may contain such impurities besides the fluorine compound that do not exhibit ferromagnetism at around room temperature, which has little influence on magnetic properties. In order to obtain a high resistance, the fluorine compound layer may contain fine particles of nitrogen compounds or carbides.

As has been discussed, when a layer containing fluorine compound on the iron group magnetic material powder is formed, followed by heat treatment and molding, a molding with balanced low coercive force and high magnetic flux density can be provided. When such molding is applied to an electric rotating machine, a low loss and high induction voltage are realized. The molding is also applied to magnetic circuits including various electric rotating machines.

DETAILED DESCRIPTION OF PREFERRED EMBODIMENTS

In the following, preferred embodiments for practicing the present invention are explained.

Embodiment 1

Quenched powder containing a main amount of $Nd_2Fe_{14}B$ was prepared as NdFeB group powder. The quenched powder contained $Nd_2Fe_{14}B$ as a main phase, Nd rich phase and B rich phase such as $Nd_{1.1}Fe_4B_4$. In the examples of the specification, the NdFeB powder is the same material as mentioned above, otherwise specified. A fluorine compound was formed on the surface of the powder. When $NdF_3$ is formed on the quenched powder, $Nd(CH_3COO)_3$ as a starting material was dissolved in water and HF was added thereto. When HF was added, gelatin of $NdF_3 \cdot xH_2O$ was formed. The resulting product was centrifuged to remove the solvent. The product was admixed with NdFeB powder and was coated. The solvent of the mixed product was vaporized and heated to evaporate hydrolyzed water. The resulting film was subjected to analysis with XRD (energy diffraction X ray analysis).

The film was formed along the uneven surface of the NdFeB powder. As a result, it was revealed that the film comprised $NdF_3$, $NdF_2$, NdOF, etc. When the powder having a particle size of 1 to 300 μm was heated, while preventing oxidation, at a temperature lower than 800° C. at which magnetic properties become worse, magnetic powder with a high resistance layer and a residual magnetic flux density of 0.7T or more was produced.

If the powder has a particle size of less than 1 μm, the powder is easily oxidized, and if the particle size is larger than 300 μm, improvement of magnetic properties by forming the high resistance film and the fluorine compound is insufficient. The magnetic powder was charged in a metal mold to pre-mold it under a compression pressure of $2t/cm^2$, and it was pressure-molded in a larger mold at a temperature of 500 to 800° C., without taking out the molding from the mold into an atmosphere. At this stage, the fluorine compound and magnetic powder whose main component is $Nd_2Fe_{14}B$ as the mother phase in the mold are deformed under a load of $3t/cm^2$ thereby to exhibit magnetic anisotropy. As a result, a high resistance magnet having a residual magnetic flux density of 1.0 to 1.4 T and a specific resistance of 0.2 to 2 mΩcm was obtained.

A rectangularity of demagnetization curve of the molding depends on molding conditions and fluorine compound forming conditions. This is because a direction of c-axis of the mother phase crystal of $Nd_2Fe_{14}B$ is different depending on molding conditions and fluorine compound forming conditions.

Further, it was revealed by analysis of structure and composition of the molding with a transmission electron microscope that an inclined angle of demagnetization curve of the molding in the vicinity of the zero magnetic field depends on the distribution degree of the c-axis and structure and composition in the vicinity of interfaces between the fluorine compound and the magnetic material powder. When a density of the molding is 90 to 99%, the fluorine compound layer integrates, diffuses and grows in the molding; the molding is partially sintered wherein the fluorine compound is a binder.

In case where the thickness of the fluorine compound layer is about 500 nm, a particle size of the fluorine compound immediately after molding is 20 nm and the particle size in the molded powder was 30 nm; the fluorine compound layers formed on the surfaces of different magnetic material powder are bonded wherein there were many points where crystal grains grow and are sintered. It was revealed that Fe was present in the grown crystals of fluorine compound. Because Fe was not present in the fluorine compound before crystal grain growth, it is though that Fe moved by diffusion from the magnetic material powder at the time of crystal grain growth.

It is presumed that rare earth elements and oxygen that are present in the surface of the magnetic material powder also diffuse simultaneously with Fe. The fluorine compound into which Fe diffuses contains more $NdF_2$ than $NdF_3$. A concentration of Fe in the fluorine compound measured by XRD analysis was 1 to 50% on average. The fluorine compound was amorphous around the composition of 50% of Fe. Because oxygen was contained, it was revealed that besides NdFeB magnetic powder whose main component is $Nd_2Fe_{14}B$ mother phase, there were $NdFeF_2$, $NdF_3$, Nd (O,F) and amorphous NdFeFO, and 1 to 50 at % of Fe on average was contained in the fluorine compound and oxy-fluorine compound. Although it is not precisely revealed that Fe atoms are present at which sites, it is presumed that Fe atoms are replaced with fluorine atoms or rare earth elements.

The balanced high residual magnetic flux density and high resistance are achieved the fluorine compound is formed in R-Fe-X (where R is a rare earth element, X is a third element) or an R-T compound (where R is a rare earth element and T is Fe, Co or Ni). The crystal grains in the fluorine compound grow to diffuse into the mother phase; sintering of the crystal grains takes place by means of the fluorine compound as a sintering binder. As these fluorine compounds, RFn (n is 1 to 3), which consisting essentially of R selected from the group consisting of one of 3d transition elements selected from Li, Mg, Ca and rare earth elements and fluorine, which is produced by sintering under pressure and contains 1 to 50 atomic %. If a concentration of Fe in the fluorine compound is larger than 50 atomic % until 80 atomic %, apart of fluorine compound becomes amorphous, which may make magnetic properties worse. Accordingly, molding conditions and forming conditions of fluorine compounds should be properly selected to achieve a concentration of Fe to be 50 atomic % or less, thereby to avoid deterioration of magnetic properties.

Besides $NdF_3$ there are as fluorine compounds $NdF_3$, LiF, $MgF_2$, $CaF_2$, $ScF_2$, $VF_2$, $VF_3$, $CrF_2$, $CrF_3$, $MnF_2$, $MnF_3$, $CoF_2$, $CoF_3$, $NiF_2$, $ZnF_2$, $AlF_3$, $GaF_3$, $SrF_2$, $YF_3$, $ZrF_3$, $NbF_5$, AgF, $InF_3$, $SnF_2$, $SnF_4$, $BaF_2$, $LaF_2$, $LaF_2$, $CeF_3$, $PrF_2$, $PrF_3$, $NdF_2$, $SmF_2$, $SmF_3$, $EuF_2$, $EuF_3$, $GdF_3$, $TbF_3$, $TbF_4$, $DyF_2$, $DyF_3$, $HoF_2$, $HoF_3$, $ErF_2$, $ErF_3$, $TmF_2$, $TmF_3$, $YbF_2$, $YbF_3$, $LuF_2$, $LuF_3$, $PbF_2$, and $BiF_3$. When these fluorine compounds are surface-treated with a solution containing a compound having oxygen or carbon, oxy-fluorine compounds are obtained. When a concentration of Fe of 1 to 50 atomic % in the compounds, a recoil magnetic permeability can be controlled to be 1.05 to less than 1.30 thereby to reduce a loss of the magnet.

Embodiment 2

A $DyF_3$ layer or $TbF_3$ layer was formed on $Nd_2Fe_{14}B$ magnetic powder with a high residual magnetic flux density to which an additive element with a high coercive force such as Dy, Tb or Pr is not added, thereby to achieve a high residual magnetic flux density and high coercive force. An alloy having a composition close to $Nd_2Fe_{14}B$ was melted by a high frequency melting to produce a cast ingot. The ingot was crushed by a crusher to obtain powder having a particle size of 1 to 10 μm.

In order to form a fluorine compound layer on the powder, a treating solution, which was prepared by gelatin $DyF_3.XH_2O$ or $TbF_3.XH_2O$ was centrifuged to remove a solvent, was admixed with the above powder. The solvent of the mixture was evaporated and the mixture was heated to remove hydrated water.

The resulting powder was press-molded in a lateral magnetic field or a vertical magnetic field of 11 thereby to orient the magnetic powder. Thereafter, the powder was sintered in vacuum at a temperature of 900 to 1100° C. for 4 hours; followed by heat-treating it at 600° C. to obtain a sintered body with a density of 90 to 99% with respect to the theoretical density. When the Dy fluorine compound is formed, the fluorine compound in the sintered body is composed of $DyF_2$, $DyF_3$, Dy(O,F), etc; diffusion of Fe or Nd into the fluorine compounds when sintered.

If a content of Fe in the fluorine compound becomes large, it is difficult to achieve the high coercive force. Thus, it is necessary to limit the content to 50 atomic %.

The Dy and Tb segregate in the vicinity of grains after sintering to thereby achieve the high residual magnetic flux density and high coercive force. As described above, when the fluorine compound having the rare earth element rich phase, which contributes to the high residual magnetic flux density and high coercive force, is formed on the surface of the magnetic powder by surface treatment to produce a sintered magnet with a residual magnetic flux density of 1.3 to 1.6 T and a coercive force of 20 to 35 kOe and with a good rectangularity.

Before charging the quenched magnetic powder, which is surface treated with the fluorine compound, in the press mold, the powder is heat treated at a temperature of 500 to 800° C. The heat treatment forms portions containing 1 atomic % of Fe and effect diffusion of rare earth elements. A heat treatment at a temperature higher than 800° C. effects growth of a soft magnetic phase such as αfe and deteriorates magnetic properties. Improvement of magnetic properties by the heat treatment at 500 to 800° C. includes increase in coercive force and rectangularity, improvement of temperature property, and high resistance. The magnet can be produced by molding together with an organic binder.

Embodiment 3

Quenched powder whose main component is $Nd_2(Fe, Co)_{14}B$ as NdFeB group powder was prepared. A fluorine compound was formed on the surface of the quenched powder. The quenched powder may contain amorphous portions. In forming $DyF_3$ on the surface of the quenched powder, a solution of $Dy (CH_3COO)_3$ was dissolved in water and HF was added to produce gelatin $DyF_3.xH_2O$. The resulting compound was subjected to centrifugation to remove a solvent. The resulting was admixed with NdFeB powder. The solvent of the mixture was vaporized and the mixture was heated to remove hydrated water.

The resulting fluorine compound layer having a thickness of 700 μm was investigated by an XRD. As a result, it was found that the fluorine compound film comprised $DyF_3$, $DtF_2$, DyOF, etc. The magnetic powder having a particle size of 1 to 300 μm was heated at a temperature lower than 800do° C. at which the magnetic properties become worse, while preventing oxidation, to produce magnetic powder having a high resistance layer and a residual magnetic flux density of 0.7T or more. It was confirmed that the coercive force and rectangularity of the magnetic powder were improved by heating at 350 to 750° C.

In the particle size is less than 1 μm, the powder is easily oxidized to make the magnetic properties worse, and if the particle size is larger than 300 μm, effects of high resistance and of magnetic property improvement, which is caused by forming the fluorine compound, are unsatisfactory.

The magnetic powder was charged in a mold and pre-molded under a compression pressure of $1t/cm^2$, followed by pressure-molding the pre-molding in a larger mold at a temperature of 400 to 800° C., without taking out the pre-molding into the atmosphere. The fluorine compound and the magnetic powder whose main component is $Nd_2Fe_{14}B$ in the mold were deformed under a pressure of $1t/cm^2$ or more to realize magnetic anisotropy. As a result, the residual magnetic flux density became 1.0 to 1.4T and a high specific resistance became 0.2 to 20 mΩcm.

A rectangularity of demagnetization curve of the molding depends on molding conditions and the molding conditions of the fluorine compound. This is because orientation of c-axis, which is a crystal axis of the mother phase, i.e. $Nd_2Fe_{14}B$, differs in accordance with the molding conditions and molding conditions of fluorine compound.

Further, it was revealed by structure analysis and composition analysis with a transmission electron microscope that an inclination of the demagnetization curve of the molding in the vicinity of zero magnetic field depends on distribution degree of the c-axis and a structure and composition in the vicinity of the interface between the fluorine compound and magnetic powder. In a molding having a density of 90 to 99%, the fluorine compound brings about integration, diffusion and grain growth, and is partially sintered wherein the fluorine compound layer on the magnet powder is a binder.

When a thickness of the fluorine compound layer is 500 nm, a particle size of the fluorine compound immediately after the formation of the fluorine compound on the magnetic powder is 1 to 100 nm, but a particle size of the fluorine compound in the molding is 10 to 500 nm, wherein the fluorine compound layers on different magnetic powder bond and integrate to grow inside the bonded fluorine compound layers. It was revealed that iron, cobalt and Nd were present in the fluorine compound. Since iron was not present in the fluorine compound before the grain growth, it is thought that iron diffused and transferred from the magnetic powder at the time of grain growth. It is presumed that with diffusion of iron, rare earth elements and oxygen that was present in the surface of the magnetic powder diffused.

Fluorine compound into which iron diffuses contains more $DyF_2$ than $DyF_2$. A surface concentration of iron in the fluorine compound, which was measured by EDX analysis, was 1 to 50 at % on average. If the concentration of iron is about 50% or more, the fluorine compound was amorphous. Because oxygen was contained, it is presumed that besides NdFeB magnetic powder whose main component is $Nd_2Fe_{14}B$, (Dy, Nd) $F_2$, $NdF_3$, Nd (O, F) and amorphous DyFeFO were present in the molding and that 1 to 50% of iron on average was contained in the fluorine compound.

Although it has not been confirmed precisely that iron atoms are arranged in which sites, it is presumed that they are arranged at fluorine atoms or rare earth elements to replace them. The balanced high residual magnetic flux density and high resistance are realized by forming Nd-Fe-X (X is a third element such as B or C) or Nd-Fe compound such as $Nd_2Fe_{17}$, $Nd_2Fe_{19}$), and by effecting diffusion reaction with a mother phase when crystal grains grow in the fluorine compound layer, wherein the fluorine compound layer works as a binder for sintering.

The fluorine compound layer can be used as a binder for NdFeB group magnets, SmCo group magnets, amorphous alloys, which is a Fe group soft magnetic material, silicon steel plate, and electromagnetic stainless steel. When the materials are irradiated with a millimeter-wave or microwave, the fluorine compound is selectively bonded by heat generation.

Embodiment 4

Quenched powder whose main component was $Nd_2(Fe, Co)_{14}B$ was prepared as NdFeB group powder, and fluorine compound was formed on the surface of the powder. The quenched powder was flake powder having a thickness of 15 to 50 μm. The powder may contain amorphous phase.

In forming NdF3on the surface of the quenched powder, $Nd(CH_3COO)_3$ as a staring material was dissolved in water and HF was added to the solution. By adding HF to the solution, gelatin form $NdF_3.xH_2O$ was formed. The gelatin was subjected to centrifugation to remove the solvent. The resulting was admixed with NdFeB powder. The solvent of the mixture was evaporated to remove it and it was heated to remove hydrated water.

A resulting fluorine compound layer of 100 nm thick was subjected to XRD analysis. As a result, it was revealed that the fluorine compound layer was composed of $NdF_3$, $NdF_2$, NdOF, etc. When the magnetic powder having a particle size of 1 to 300 μm was heat-treated, while preventing oxidation, at a temperature of 700° C. at which magnetic properties are deteriorated, magnetic powder having a high resistance layer and a residual magnetic flux density of 0.7T or more was obtained. At this time, it was confirmed that coercive force and rectangularity of the magnetic powder were improved when the magnetic powder was heat-treated at 750° C. If the particle size is less than 1 μm, the magnetic powder is easily oxidized so that magnetic properties become worse. Further, if the particle size is larger than 300 μm, improvement of magnetic properties by high resistance and formation of fluorine compound will be insufficient.

In molding, the magnetic powder is charged in a mold to mold it under a pressure at a temperature of 800° C. As a result, a molding having a residual magnetic flux density of 0.7 to 0.9T and a specific resistance of 0.2 to 20 mΩcm was obtained. The molding has different densities depending on heating-molding conditions; in order to obtain a density of 90% or more, press-molding at 500 to 800° C. is preferable. Although a high density is expected by molding at a high temperature, other elements tend to diffuse into the fluorine compound layer. Therefore, molding at a low temperature is preferable.

Figure 4:
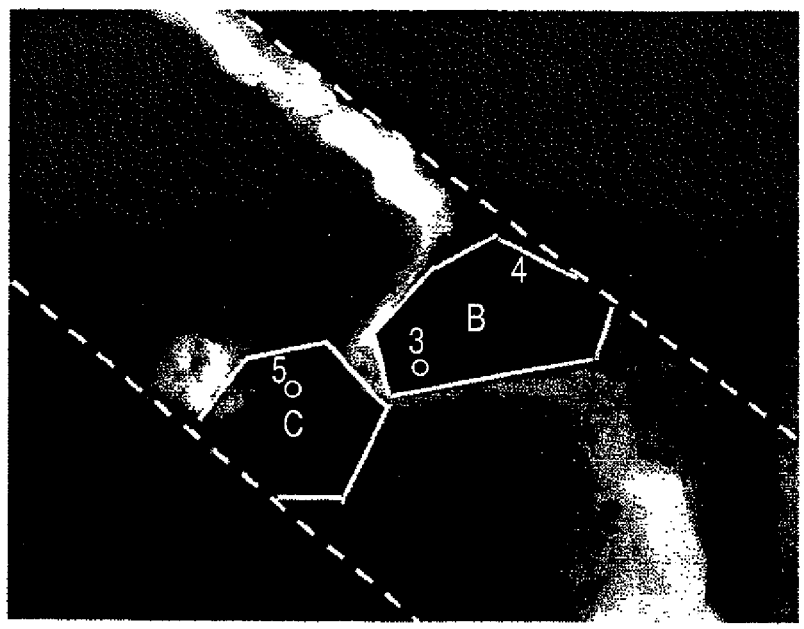

FIG. 4 shows a transmission electron microscope photograph of a sectional view of a sample, which was obtained by molding magnetic powder having a $NdF_3$ layer of 100 nm thick thereon. In FIG. 4, an area circled by a dotted line is $NdF_3$ layer and an area A circled by a solid line is particles of $NdF_3$. After coating of $NdF_3$, the $NdF_3$ particles in the $NdF_3$ layer had a particle size of 1 to 20 nm. By press-molding, the $NdF_3$ particles grow to become particles having 100 nm or more. FIGS. 2 (1), 2 (2) show EDX analysis profiles of $NdF_3$ particles in the area A. FIG. 2 (1) shows the result obtained from point 1 in the area A, and FIG. 2 (2) the result obtained from point 2 in the area A. There are observed in the profile signals of Nd, Fe, F, O, Mo and Ga. Mo is a signal from a mesh on which the sample was placed, not from the molding. Ga is a signal from ions irradiated for making a thin film.

Fe was not observed in the profile of $NdF_3$ or $NdF_2$ layer immediately after the formation of coating; it is presumed that Fe diffused into the fluorine compound at the time of heat-molding. Fe was observed in areas other than the area A; a concentration of Fe was 1 at % or more (an amount of Fe per the total amount except B).

Figure 5:

FIG. 5 shows a transmission electron microscope photograph of a cross section of a sample, which was obtained by molded at a temperature higher than that used for molding of the sample shown in FIG. 4. In FIG. 5, crystal grains (about 200 nm in size) of an Nd fluorine compound larger than those in FIG. 4 were observed. EDX profiles measured for grains in area B and area C are shown in FIGS. 2 (3), 2 (4) and 2 (5). FIGS. 2 (3) and 2 (4) correspond to point 3 in the area B and FIG. 2 (5) corresponds to point 5 in the area C.

Fe was observed in any of the profiles (3) to (5) of at least 1 atomic %. Since the crystal grains were $NdF_2$, it is presumed that Fe replaced in lattices of the $NdF_2$ crystal.

Figure 3:
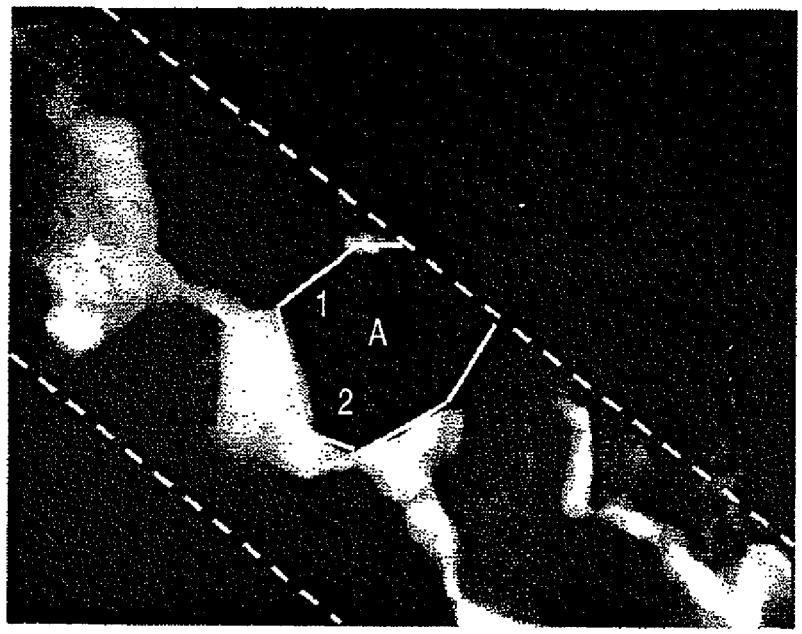
FIGS. 3 to 5 are microscopic photographs of magnetic powders observed by a transmission electron microscope.
Figure 6:
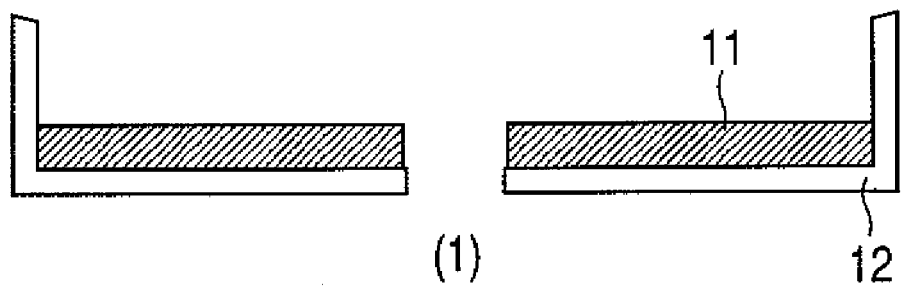
FIG. 6 is a cross sectional view of a motor according to an embodiment of the present invention.
Figure 6:
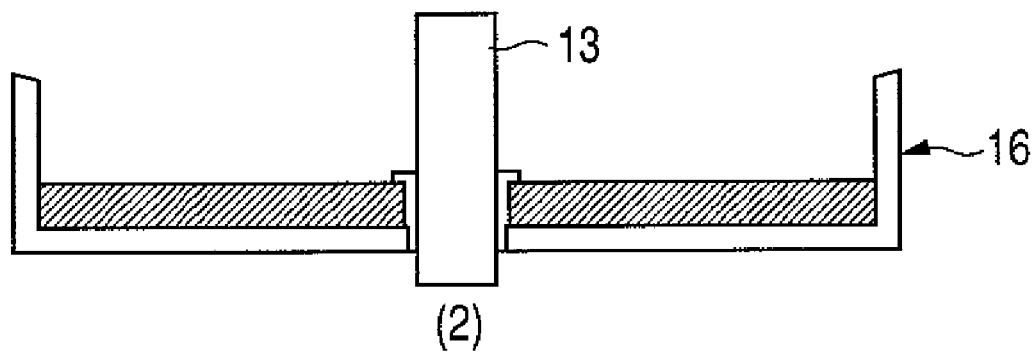
Figure 6:
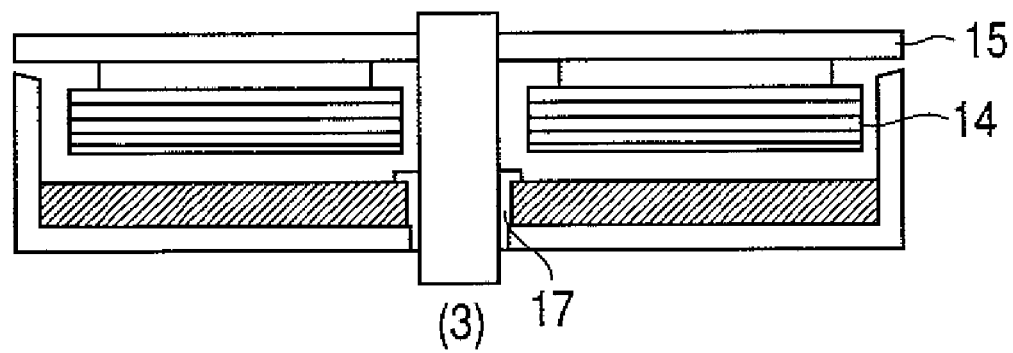

FIG. 6 shows a transmission electron microscope photograph of a cross section of a sample, which was molded at a temperature further higher than that of the sample shown in FIG. 5. In case of FIG. 6, grain boundaries became unclear and a sample having an average size of 500 nm was found. EDX analysis profiles measured on grain areas 6, 7 and 8 of $NdF_3$ in FIG. 6 are shown in FIGS. 3 (6), 3(7), 3(8). The relationship between FIG. 6 and FIGS. 3(6), 3(7) and 3(8) are the same as that between FIG. 5 and FIGS. 2(3), 2(4) and 2(5). It is seen in FIGS. 3(6)-3(8) that a peak of Fe representing a concentration of Fe atoms is higher than that of Nd in a range of from 4.0 to 8.0 keV.

On the other hand, it is seen from a diffraction pattern that a portion of F is $NdF_2$, which has a concentration of Fe smaller than that in amorphous phase. The Fe concentrations in D and F are larger than 50%, but in F the concentration is less than 50%. According to these facts, it is revealed that growth of a layer having a Fe concentration of 50% or more and an amorphous phase is suppressed by controlling the Fe concentration in the fluorine compound layer or oxy-fluorine compound layer. For this purpose, low temperature press-molding or short time molding in a low oxygen concentration are exemplifies as heat-press molding conditions. By controlling the Fe concentration in the fluorine compound layer to 50% or less, it is possible to realize a demagnetization curve has a recoil magnetic permeability of 1.04 to 1.30.

Embodiment 5

Hydrogen treated powder whose main component was $Nd_2Fe_{14}B$ was prepared as NdFeB powder, and fluorine compound was formed on the surface of the powder.

In case of $NdF_3$ coating, a semi-transparent sol state solution having an $NdF_3$ concentration of 1 g/10 mL was used in the following steps.

(1) 15 mL of $NdF_3$ coating film forming treating solution was added to 100 g of rare earth element magnetic powder having an average particle size of 70 to 150 μm, and the mixture was stirred until the whole of magnetic powder was wet.

(2) Methanol was removed in a reduced pressure of 5 torr from the above (1) magnetic powder treated with the $NdF_3$ coating film treating solution.

(3) The magnetic powder from which the solvent was removed was charged in a mortal boat, and heat-treated at 200° C. for 30 minutes and 400° C. for 30 minutes under a pressure of $1 \times 10^{-5}$ torr.

(4) Magnetic properties of the rare earth magnetic powder subjected to heat treatment at (3) were investigated.

The film was investigated with XRD. As a result, it was confirmed that the fluorine compound layer was composed of $NdF_3$, $NdF_2$, NdOF, etc. When the powder having a particle size of 50 to 150 μm was heated at 800° C., while preventing oxidation of the powder, a high resistance layer was formed on the surface thereof. If a particle size is less than 1 μm, the powder is easily oxidized so that magnetic properties become worse. If the particle size is larger than 300 μm, an improvement of magnetic properties by making high resistance and forming of fluorine compound will be insufficient.

After the magnetic powder is charged in a mold and was press pre-molded under a load of 2t/cm² in a magnetic field, it was further sintered in the mold at 800° C., without taking out the molding into the atmosphere from the mold. As a result, the residual magnetic flux density of the molding was 1.0T to 1.4T and a specific resistance was 0.2 to 2 mΩcm to produce a high resistance magnet.

Rectangularity of demagnetization of the mold depends on orientation conditions, sintering conditions of the magnetic powder and forming conditions of the fluorine compound.

An inclination of the demagnetization of the molding in the vicinity of a zero magnetic field depends on distribution of the c-axis orientation and a structure and composition in the vicinity of interfaces between the fluorine compound and magnetic powder.

If the molding has a density of 90 to 99%, the fluorine compound layer integrate, diffuse and grow during molding so that the fluorine compound layer on the magnetic powder is a binder for sintering to effect a partial sintering. If the fluorine compound layer has a thickness of about 500 μm, the particle size of the fluorine compound immediately after the forming the fluorine compound on the magnetic powder is 1 to 30 μm. The particle size of fluorine compound during molding becomes 10 to 500 μm, wherein the fluorine compound layers formed on different surfaces of the magnetic powder bond each other and crystal grains grow in the bonded fluorine compound layers; many sintered portions were observed.

It was also confirmed that there was Fe in the crystals of fluorine compound. Because Fe was not present in the fluorine compound before grain growth of the fluorine compound, it is presumed that Fe diffused and moved from the magnetic powder at the time of grain growth. It is also presumed that rare earth elements and oxygen that was present on the surface of the magnetic powder diffuse together with iron. Fe diffuses more into $NdF_2$ than in $NdF_3$.

A concentration of Fe in the fluorine compound that measured by EDX analysis was 1 to 50% on average. The fluorine compound was amorphous around 50% of Fe concentration.

It was revealed that since oxygen was present, $NdF_2$, $NdF_3$, Nd(O,F), and NdFeO amorphous phase, Nd rich phase and B rich phase were present in addition to NdFeB magnetic powder whose main component is $Nd_2Fe_{14}B$ mother phase and that Fe of 1 to 50% was contained in the fluorine compound and/or oxy-fluorine compound. Although it is not elucidated precisely yet where iron atoms are present, it is presumed that iron atoms replace fluorine atoms or rare earth element.

The balanced high residual magnetic flux density and high resistance are realized when fluorine compound is formed on Nd-Fe-X (X: B or C as a third element) or Nb-Fe such as $Nd_2Fe_{17}$ or $Nd_2Fe_{19}$, and when crystal grains in the fluorine compound grow to effect diffusion reaction with the mother phase and the fluorine compound becomes a binder for sintering. Such fluorine compounds as $RF_n$ (n is an integer of 1 to 3) or $R_w(O_xF_y)_z$ wherein w, x and y are integers and R is a member selected from the group consisting of Li, Mg, Ca, Sc, Mn, Co, Ni, Zn, Al, Ga, Sr, Y, Zr, Nb, Ag, In, Sn, Ba, La, Pr, Nd, Sm, Eu, Gd, Tb, Dy, Ho, Er, Tm, Yb, Lu, Pb and Bi. The fluorine compounds comprises an element selected from Li, Mg, Ca, 3d transition elements or rare earth elements and fluorine containing Fe of from 1 to 50%. If the concentration of Fe in the fluorine compound exceeds 50%, i.e. more than 50 to 80%, a part of fluorine compound becomes amorphous to deteriorate magnetic properties. Thus, it is necessary to choose conditions of heating, pressure and forming of fluorine compound so as to control the Fe concentration to be 50% or less.

A molded sample of NdFeB group ferromagnetic material having a $Nd_2Fe_{14}B$ crystal structure and having a density of 95 to 98% was coated with an $NdF_3$ or $NdF_2$ layer. The sample was subjected to evaluation of loss at a frequency of 1 kHz thereby to calculate an eddy current loss and hysteresis loss.

FIG. 1 shows a relationship between a recoil magnetic permeability and specific resistance and a relationship between the recoil magnetic permeability and various losses. The abscissa indicates the recoil magnetic permeability, and the ordinate indicates the specific resistance, eddy current, hysteresis loss and a total loss of the eddy current plus the hysteresis loss.

As is understood from FIG. 1, the specific resistance increases as the recoil magnetic permeability increases. However, the total loss of the eddy current loss plus the hysteresis loss does not decrease even if the specific resistance and the recoil magnetic permeability are large. It is said from the result of tests that the recoil magnetic permeability, which can reduce the loss most, is within a range of from 1.04 to 1.3. If the permeability exceeds 1.3, the magnetic powder has a loss larger than that of NdFeB molding.

When a thickness of the fluorine compound layer is made thicker and the molding is heated at a temperature higher than 800° C. in order to increase the specific resistance, Fe diffuses to increase a soft magnetic component and the recoil magnetic permeability as well. This leads to an increase in the hysteresis loss, and further to an increase of the total loss.

In order to avoid an increase in the recoil magnetic permeability, it is necessary to control an amount of diffused Fe in the fluorine compound to be less than 50%. Accordingly, it is preferable to conduct the molding at a temperature range of from 500 to 800° C., particularly at relatively low temperature of the above temperature range to thereby control a thickness of fluorine compound layer to be 300 nm or less and to prevent diffusion of Fe into the fluorine compound layer.

Embodiment 6

After oxides are removed by acid-washing the surface of the $Nd_2Fe_{14}B$ sintered magnet, $NdF_3$ was formed on the surface of the sintered magnet in the following manner.

As a starting material, $Nd(CH_3COO)_3$ was dissolved in water, and HF was added to the solution. By adding HF, gelatin like $NdF_3.xH_2O$ was formed. The gelatin was subjected to centrifugation to remove water. The resulting gelatin was coated on the surface of the $Nd_2Fe_{14}B$ sintered body. The solvent of the coating was evaporated and the coating was heated to evaporate hydrated water. The coating was subjected to XRD analysis. As a result, it was revealed that the fluorine compound layer was composed of fluorine compounds and oxy-fluorine compounds such as $NfdF_3$, $NdF_2$, NdOF, etc.

The resulting sintered body was heated at 600° C., preventing oxidation, thereby forming a high resistance layer on the surface.

When the magnets having a high resistance layer are stacked, it is possible to lower an eddy current loss when the magnets are exposed to a high frequency magnetic field.

Since the fluorine compound generates heat when it is irradiated with millimeter-wave, magnets with a fluorine compound layer can be bonded by irradiating them with the millimeter-wave (frequency; 29 GHz) so that the fluorine compound layer selectively generates heat and bond the magnets. Heat generation of an interior of the magnets is suppressed, and reaction between rare earth elements in the fluorine compound or components for a mother phase and fluorine compound proceeds.

Upon irradiation with millimeter-wave, iron atoms diffuse into the fluorine compounds to be 1% on average. High resistance layers were formed on the surfaces of sliced magnets having a thickness of 0.1 to 10 mm thick. When the magnets are irradiated with millimeter-wave, the fluorine compound is selectively heated to thereby form a low loss sintered magnet.

Fluorine compound includes $RF_n$ (n: 1 to 3, R: rare earth element) that contains at least one of alkali metals, alkaline earth metals, and rare earth elements. By millimeter-wave irradiation or microwave irradiation, the oxy-fluorine fluorine compound containing Fe grows. The above manners can be applied to sintered magnets of different sizes.

Example 7

Quenched magnetic powder whose main component is $Nd_2Fe_{14}B$ was prepared as NdFeB powder. Fluorine compound was formed on the surface of the powder. The fluorine compound was formed on the surface of Fe group soft magnetic powder, too.

The NdFeB group magnetic powder and Fe group magnetic powder were separately pre-molded, and at least two pre-moldings were simultaneously press-molded to produce a molding including a soft magnetic material and hard magnetic material so that a magnetic circuit with a low loss was realized.

In forming $NdF_3$ as a high resistance film on the quenched powder, $Nd(CH_3COO)_3$ was dissolved in water and HF was added to the solution. By adding HF, gelatin like $NdF_3 \cdot xH_2O$ was formed. The gelatin was subjected to centrifugation to remove the solvent. The resulting gelatin was admixed with the NdFeB powder. The solvent of the mixture was evaporated and hydrated water was vaporized by heating. The gelatin was admixed with the Fe −3% Si magnetic powder. The solvent of the mixture was evaporated and hydrated water was vaporized by heating.

It was confirmed by XRD that the fluorine compound was composed of $NdF_3$, $NdF_2$, NdOF, etc. The resulting phases of the NdFeB magnetic powder and Fe −3% Si magnetic powder had a high resistance until 800° C.

NdFeB group magnetic powder with the fluorine compound layer was deformed at 650° C. to exhibit anisotropy and improved magnetic properties. Fe group soft magnetic powder with the fluorine compound layer was molded at the above temperature. Hysteresis loss was reduced by heating for stress-releasing after molding, and an eddy current loss was reduced because the high resistance was maintained.

Since molding at 650° C. is a temperature at which the NdFeB magnetic powder with the fluorine compound layer and the Fe magnetic powder with the fluorine compound layer are press-molded, keeping the high resistance and magnetic properties, a density of 90 to 99% could be maintained. In this case, there is fluorine compound between NdFeB magnetic powder and Fe magnetic powder; deformation, diffusion and bonding of the fluorine compound form the molding.

The use of fluorine compound reduces a difference in thermal expansion coefficients. Since the above method is different from the anisotropy imparting molding method, the materials can be molded simultaneously. Depending on the shapes of parts, after molding the NdFeB magnetic powder, the Fe magnetic powder is molded at around room temperature, and a stress releasing heat treatment is applied at last.

Embodiment 8

After a Ta under layer having a thickness of 10 nm or more was formed on a glass substrate by a sputtering method, a NdFeB thick film having a thickness of 10 to 100 μm was formed on the Ta under layer.

In forming $DyF_3$, Dy $(CH_3COO)_3$ was dissolved in water, and HF was added thereto to form gelatin like $DyF_3 \cdot xH_2O$. The gelatin was centrifuged and was coated on the thick film. Thereafter, the solvent was removed, and hydrated water was evaporated by heating. $DyF_3$ or $DyF_2$ was grown on the surface of the NdFeB thick film. A thickness of fluorine compounds were 1 to 100 nm and 30 nm on average.

A millimeter-wave or microwave was irradiated on the fluorine compound film to heat the film to diffuse Dy or F atoms into the surface of the NdFeB film. As a substrate, $SiO_2$ group glass, which is hard to be heated by millimeter-wave or microwave is preferable.

Fe and Nd diffuse together with Dy and F so that 1 at % of Fe was observed in the fluorine compound, and rectangularity and coercive force of the NdFeB were improved. The thick film magnet had a residual magnetic flux density of 0.7 to 1.1 and a coercive force of 10 to 20 kOe.

Embodiment 9

Figure 7:
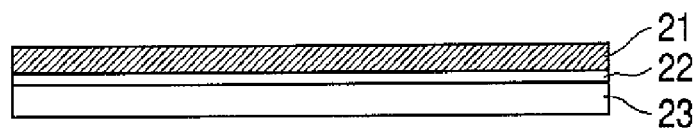
FIG. 7 is a flow chart of forming a magnetic disc.
Figure 7:
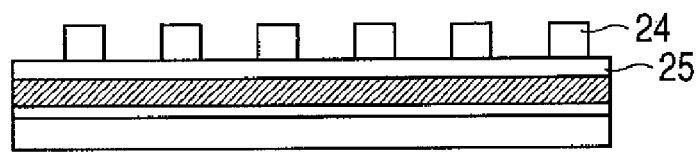
Figure 7:
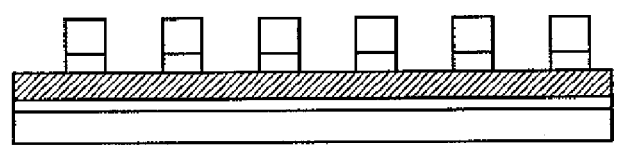
Figure 7:
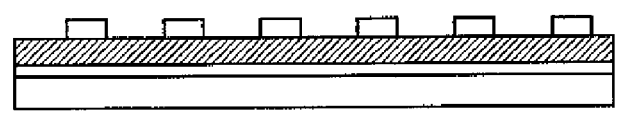
Figure 7:
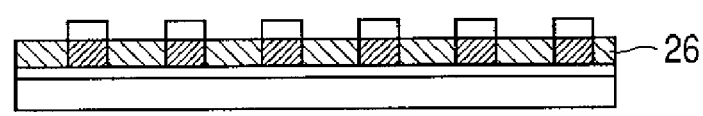

In FIG. 7 showing a cross sectional view of a motor, a permanent magnet 11 was brought into contact with a soft magnetic material 12. The permanent magnet and the soft magnetic member 12 constitute a rotor 16. The rotor 16 is supported by a shaft 13 by means of a fixing member 17. The permanent magnet 11 had a thickness of 500 μm. In order to improve magnetic properties of the permanent magnet 11, a fluorine compound was coated on the permanent magnet 11 to grow fluorine compound particles of 10 nm on the permanent magnet. Then, the coating was heated at 400 to 800° C. to improve coercive force. The stator 15 to which a stator coil 14 is fixed.

The fluorine compound is an oxygen containing fluorine compound such as Dy(OF), Nd(OF), a carbon containing fluorine compound such as Dy(O,F,C), which are formed in lamellar form by surface treatment with DyFe or an alcohol solution containing $DyF_2$. The fluorine compound is a permanent magnet constituting $Nd_2Fe_{14}B$ whose main structure is a cubic crystal.

The permanent magnet may be either a thick film or sintered magnet. A shaft 13 was inserted and a coil 14 was disposed. The heating can be conducted by millimeter-wave.

According to the present invention, it is possible to provide A motor comprising a stator 15 having a stator coil 14, a shaft 13, and a rotor 16 fixed to the shaft 13 and having a permanent magnet 11 fixed to the rotor, wherein the permanent magnet is made of a magnet comprising grains of a ferromagnetic material whose main component is iron and a fluorine compound layer or an oxy-fluorine compound layer of fluoride compound particles of alkali metals, alkaline earth metals and rare earth elements, present on the surface of the ferromagnetic material grains, wherein an amount of iron atoms in the fluorine compound particles is 1 to 50 atomic %.

The permanent magnet is supported by a soft magnet member 12 fixed to the shaft 13.

Embodiment 10

In FIG. 8, a Ta under layer 22 having a thickness of 100 nm was formed by sputtering on a $SiO_2$ group substrate 23. An $Nd_2Fe_{14}B$ film 21 having a thickness of 1000 nm was formed on the Ta under layer 22. A gelatin $DyF_3 \cdot xH_2O$ solution containing Fe ions, which has been subjected to centrifugation, was coated with a spinner to form a coating of 1 to 1000 nm.

A resist 24 was coated on the fluorine compound layer 25, and the resist was subjected to exposure and development thereby forming a resist pattern 24 as shown in (2).

Then, uncovered portions of the fluorine compound layer 25 were removed by an ion milling method as shown in (3). Thereafter, the resist mask was removed with an organic solvent as shown in (4). The millimeter-wave heat treatment was applied to the film. As a millimeter-wave heater, a 28 GHz millimeter-wave heating apparatus manufactured by Fuji Denpa Industries was used to selectively heat the fluorine compound only.

The heating caused diffusion between the fluorine compound and the NdFeB film in contact with the fluorine compound thereby growing a reaction layer 26, which resulted in change of magnetic properties of the NdFeB film. The reaction layer 26 may be formed only at the interface between the fluorine compound layer 25 and NdFeB film.

Change of magnetic properties depends on kinds of fluorine compounds used. When a fluorine compound such as $DyF_3$ or $TbF_3$ is used, change of magnetic properties such as improvement of coercive force of the NdFeB film near the contact point and suppression of thermal demagnetization were observed. Like that, it is possible to change only the portion of the NdFeB film in contact with the fluorine compound layer; an area where the magnetic properties changes is changed in accordance with sizes of the mask patterns. The pattern size may vary from sub-micron patterns to larger patterns.

Magnetic properties of not only NdFeB, but also Fe group magnetic films such as FePt, FeSiB, NiFe, etc or Co group magnetic films such as CoFe, CoPt, etc can be changed only at contact portions.

Since the millimeter-wave is used, it is possible to heat only the fluorine compound and in its vicinity, it is possible to heat selected portions of the fluorine compound layer, which is formed all over the surface of the fluorine compound layer. It is also possible to conduct heat treatment without the under layer. This method can be applied to not only magnetic recording media, but also to a partial heating of magnetic heads.

Further, NdFeB thick films having a thickness of 10 to 100 μm was formed after forming a Ta under layer having a thickness of 10 nm or more by a sputtering method.

In forming $DyF_3$, $Dy(CH_3COO)_3$ was dissolved in water, and HF was added thereto to obtain a gelatin like NdF3.xH2O. The gelatin was centrifuged and was coated on the thick film. Thereafter, the solvent was removed, and hydrated water was evaporated by heating. As a result, $DyF_3$ or $DyF_2$ grew on the surface of the NdFeB thick film. The thickness of the fluorine compound was 1 to 100 nm. The fluorine compound layer can be formed by a sputtering method or evaporation method.

A millimeter-wave or microwave was irradiated to the fluorine compound layer to heat it so that Dy or F atoms were diffused from the surface of NdFeB film. As a substrate, SiO2 glass, which is hard to be heated by millimeter-wave or microwave, is suitable.

Diffusion of Dy and F atoms accompanies diffusion of Fe and Nd so that there was Fe in a concentration of 1 at %. At the same time, rectangularity and coercive force of NdFeB were improved. A thick film magnet having a residual magnetic flux density of 0.7 to 1.1 T and a coercive force of 10 to 20 kOe was obtained.

Embodiment 11

A fluorine compound of rare earth element or alkaline earth metal was coated on a soft magnetic plate in the following manner.

(1) A solution for forming a fluorine compound of Nd was prepared as follows.

A water soluble salt of Nd was mixed with water and the salt was dissolved under stirring. Diluted hydrofluoric acid was gradually dropped in the solution. The solution containing gelatinous precipitate of fluorine compound was further stirred and centrifuged. After the centrifugation, methanol was added to the precipitate. The methanol solution was stirred and centrifuged. Thereafter, methanol was added. After stirring of the methanol solution, and corrosive ions were diluted.

(2) The solution for coating $NdF_3$ was dropped into the methanol solution, and the solution was stirred until the soft magnetic plate was wet.

(3) The soft magnetic plate coated with $NdF_3$ was subjected to removal of methanol under a reduced pressure of 5 torr.

(4) The soft magnetic plate was heated at 200° C. for 30 minutes and 400° C. for 30 minutes under a reduced pressure of $1\times10^{-5}$ torr after the solvent was removed.

Fe-Si-B (Si 10%, B 5%) amorphous sheet was selected from soft magnetic plate was iron material such as amorphous sheet, electromagnetic stainless plate and ferromagnetic material of Co or Ni. After the fluorine compound $NdF_3$ was coated on the Fe-Si-B amorphous sheet, the coating was heated by millimeter-wave to heat only parts in contact with the fluorine compound. When the fluorine compound is formed on selected portion of the surface of the soft magnetic plate, only the portion of the fluorine compound layer of $NdF_3$ was heated by the millimeter-wave and Fe diffused into $NdF_3$ by 1 atomic %.

By heating selectively the coating, heated portion can be made low loss and non-heated portion can be made high mechanical strength. When electromagnetic stainless steel plate partially coated with fluorine compound is heated by millimeter-wave, only heated portion can be changed from ferromagnetic plate to non-magnetic plate or from non-magnetic plate to ferromagnetic plate. Therefore, this technology can be applied to an electric rotating machine.

Embodiment 12

Gelatinous or sol fluorine compound of rare earth elements was coated on an $Nd_2Fe_{14}B$ sintered magnet. A thickness of the coating was 100 nm on average. The NdFeB sintered magnet has a main phase of $Nd_2Fe_{14}B$; the surface of the magnet has deteriorated magnetic properties caused by machining and polishing.

In order to improve the deteriorated magnetic properties, gelatinous or sol fluorine compound $D_yF_x$ (x:1 to 3) of rare earth element was coated on the surface of the sintered magnet and dried. Thereafter, the magnet was heat treated at a temperature of 500° C. or higher, but lower than a sintering temperature. The gelatinous or sol fluorine compound of rare earth element grows into particles having a size of 1 to 100 nm, and diffusion or reaction takes place in grain boundaries or surfaces when heated.

Because the gelatinous or sol fluorine compound of rare earth element is coated on the surface of the magnet, the fluorine compound $D_yF_x$, $D_y(O,F)$, $D_y(O, C, F)$ is formed along the crystal structure over almost the whole surface of the magnet. After drying the coating and prior to heating at 500° C. to a temperature lower than the sintering temperature, a part of the coating where a concentration of rare earth element is high on the surface of the magnet becomes fluorides.

Among the fluorine compounds of rare earth elements, Dy, Tb or Ho of Dy fluoride, Tb fluoride or Ho fluoride diffuses along the crystal grains there by to improve magnetic properties. If a heat treatment temperature is 800° C. or higher, the mutual diffusion between the fluorine compound and the sintered magnet proceeds further. A concentration of Fe of 10 ppm or more is found.

As the heat treatment temperature becomes higher, a concentration of Fe in the fluorine compound tends to become higher. If the Fe concentration exceeds 50%, magnetic properties of the sintered magnet become worse. Accordingly, The concentration of Fe in the fluorine compound is preferably 50% or less.

In bonding the stacked magnets mentioned above, another fluorine compound was coated on the magnets with coatings of the fluorine compound, which have been subjected to diffusion treatment; the stacked magnets were irradiated with millimeter-wave thereby to bond them by heating only the bonding portions.

The fluorine compound as the bonding material is Nd compounds such as ($NdF_{2-3}$, $Nd(OF)_{1-3}$), for example. By selecting irradiation conditions, it is possible to heat only the bonding parts selectively, while suppressing a temperature rise of the central part of the magnets. As a result, deterioration of magnetic properties and dimension change of the sintered magnets can be prevented. At the same time, it is possible to shorten a heat treating time to half or less of the time required for the conventional method. Thus, the method of heat-treating method of the present invention is highly productive.

Accordingly, the millimeter-wave can be used not only for bonding of magnets, but also for improving magnetic properties of the coating material by diffusion. Though it is possible to diffuse by heating, millimeter-wave can selectively heat the coating of fluorine compound; thus it can be used for bonding or adhesion of magnetic materials and metallic materials. An example of conditions for millimeter-wave heating is 28 GHz, 1 to 10 kW, and 1 to 30 minutes in an Ar atmosphere.

Since the millimeter heating causes only fluorine compounds or oxy-fluorine compounds that contain oxygen to generate heat, only the fluorine compound can be diffused along grain boundaries without changing a structure of a sintered body. Therefore, it is possible to prevent elements constituting the fluorine compound from diffusion into grains of the magnet. As a result, high magnetic properties (high residual magnetic flux density, good rectangularity, high coercive force, high Curie point, low thermal demagnetization, high anti-corrosion, high electric resistance, etc) are expected, compared to simple heating. By selecting millimeter-wave conditions and fluorine compounds, it is possible to diffuse constituting components of the fluorine compounds into deeper portions from the surface of the sintered magnet than the conventional heating method. Diffusion into the center of a sintered magnet of 10×10×10 (cm) could be conducted.

Magnetic properties of the thus obtained sintered magnets exhibited a residual magnetic flux density of 1.0 to 1.6T and a coercive force of 20 to 50 kOe; it could be possible to make a concentration of rare earth elements lower than that of rare earth elements contained in a conventional comparative magnets (NdFeB magnetic powder containing heavy rare earth elements). Further, if a fluorine compound or an oxy-fluorine compound containing at least one rare earth element remains on the surface of the sintered magnet, a resistance of the surface of the magnet becomes high so that stacked and bonded magnets exhibit a reduced eddy current loss and a reduced loss in a high magnetic field. Because of the reduced loss, which leads to low heat generation, an amount of heavy rare earth element used can be reduced.

Since the fluorine compounds are not powder, they can be coated inside the fine pores of 1 to 10 nm, and they can be applied to improvements of miniature size magnets.

Instead of fluorine compounds, one or more of nitrogen compounds, carbon compounds or light element compounds such as boron compounds containing at least one rare earth element is coated on the surface of the NdFeB blocks. The coating is subjected to heating with millimeter-wave to achieve bonding of the blocks or improvement of magnetic properties.

Embodiment 13

2 atomic % of Fe was added to gelatinous or sol fluorine compound of a fluorine compound containing $MnF_2$, $MnF_3$ to prepare a gelatinous or sol Fe-fluorine compound with which Fe ions or Fe clusters are admixed. Part of Fe atoms chemically reacts with fluorine or one or Mn constitutes the fluorine compounds.

When the gelatinous or sol fluorine compounds or precursors of the fluorine compounds are irradiated with millimeter wave or microwave to selectively heat the fluorine compound, there are a lot of atoms that contribute to chemical reaction of fluorine atoms and Fe atoms and one or more of components constituting the fluorine compounds or oxy-fluorine compounds. As a result, fluorine compounds or oxy-fluorine compounds of tertiary compounds comprising Fe atoms and two constituting elements of the fluorine compounds are formed thereby to produce the fluorine compounds or oxy-fluorine compounds having a coercive force of 10 kOe or more.

Fe or other transition metal ions may be added to the gelatinous or sol solution. According to the above-mentioned method, it is possible to obtain magnet materials, without employing conventional melting and crushing steps.

If M represents any of elements selected from alkali metals, alkaline earth metals, Cr, Mn, V and rare earth elements, Fe-M-F group, Co-M-F group and Ni-M-F group magnets are produced from gelatinous or sol solution, or fluorine compound solutions. The millimeter-wave irradiation makes it possible to form magnets on a substrate, which is not molten by the millimeter-wave heating. The process can be applied to a magnet having a shape, which was not machined.

The fluorine compound magnet may contain oxygen, carbon, nitrogen, boron, etc, which give little influence on magnetic properties.

Embodiment 14

A gelatinous or sol fluorine compound was coated on the surface of $Sm_2Fe_{17}N_3$ group magnetic powder having a particle size of 7 μm. The fluorine compound consists of $GdF_3$, $GdF_2$ and Gd (O,F). The fluorine compound or its precursor was coated in a thickness of 1 to 100 nm on the magnetic powder. The coated magnetic powder was charged in a mold and press-molded while orientating the magnetic powder in a magnetic field of 3 to 20 kOe to obtain a pre-molding. The thus obtained molding having magnetic anisotropy was heated by irradiation with a millimeter-wave to selectively heat the fluorine compound consisting of $GdF_3$, $GdF_2$, and Gd (O, F).

Deterioration of magnetic properties due to structure change during heating was suppressed and the fluorine compound worked as a sintering binder thereby producing a magnetically isotropic magnet, wherein the SmFeN magnetic powder was bonded with the fluorine compound. When a volume of the fluorine compound consisting of $GdF_3$, $GdF_2$, and Gd (O,F) is 0.1 to 3%, the SmFeN anisotropic magnet with a residual magnetic flux density of 1.0T or more was obtained.

It is possible to improve magnetic properties by heat-treating the pre-molding after the pre-molding is impregnated with the fluorine compound. $(Sm, Gd)_2Fe_{17}(N,F)_3$ or $(Sm, Gd)_2Fe_{17}(N,F,O)_3$ are locally formed. By the reaction with the fluorine compounds, it was confirmed that there was any of an increase in coercive force, rectangularity and residual magnetic flux density.

In case of nitrogen group magnetic powder such as SmFeN, when the SmFeN powder is heated by irradiation with the millimeter-wave to produce SmFeN magnetic powder, it is possible to obtain a coercive force of 20 kOe, because an increase in the coercive force is remarkable in the millimeter-wave heating, compared to a conventional ammonia nitrogenation. The bonding the powder with the fluorine compound by millimeter-wave can be applied to other iron group materials such as Fe-Si, Fe-C, Fe-Ni, Fe-Co or Fe-Si-B, and Co group materials. This technique can be applied to soft magnetic powders, soft magnetic foils, soft magnetic moldings, hard magnetic powders, hard magnetic foils, and hard magnetic moldings. Other metallic materials can be bonded.

Further, the fluorine compounds are $NdF_3$, $LiF$, $MgF_2$, $CaF_2$, $ScF_2$, $VF_2$, $VF_3$, $CrF_2$, $CrF_3$, $MnF_2$, $MnF_3$, $CoF_2$, $CoF_3$, $NiF_2$, $ZnF_2$, $AlF_3$, $GaF_3$, $SrF_2$, $YF_3$, $ZrF_3$, $NbF_5$, $AgF$, $InF_3$, $SnF_2$, $SnF_4$, $BaF_2$, $LaF_2$, $LaF_2$, $CeF_3$, $PrF_2$, $PrF_3$, $NdF_2$, $SmF_2$, $SmF_3$, $EuF_2$, $EuF_3$, $GdF_3$, $TbF_3$, $TbF_4$, $DyF_2$, $DyF_3$, $HoF_2$, $HoF_3$, $ErF_2$, $ErF_3$, $TmF_2$, $TmF_3$, $YbF_2$, $YbF_3$, $LuF_2$, $LuF_3$, $PbF_2$, and $BiF_3$, or oxygen containing fluorine compounds or carbon containing compounds that are formed by surface treated compounds with a solution containing oxygen or carbon.

Embodiment 15

Fine particles of $FeF_{1-3}$ containing Fe and having a particle size of 5 μm was added to a gelatinous or sol fluorine compound $GdF_3$ to produce a gelatinous or sol fluorine compound. Fe atoms on the surface of the fine particles chemically bonded with any of alkali metals, alkaline earth metals, or rare earth elements that constitute the fluorine compound. Irradiation with the millimeter-wave or microwave to the gelatinous or sol fluorine compound $GdF_3$ containing the fine particles increases atoms that contribute to chemical bonding between fluorine atoms and Fe atoms or constituting elements Gd for the fluorine compound so that ternary or more fluorine compound containing Fe-fluorine and the constituting element is formed. The irradiation with the millimeter-wave or microwave produces a fluorine compound having a coercive force of 10 kOe or more.

Instead of Fe fine particles, other transition metal fine particles can be added. Fe or other transition metal ions may be added to the gelatinous or sol solution. According to the above-mentioned method, it is possible to obtain magnet materials without employing conventional melting and crushing steps.

If M represents any of elements selected from alkali metals, alkaline earth metals, Cr, Mn, V and rare earth elements, Fe-M-F group, Co-M-F group and Ni-M-F group magnets are produced from gelatinous or sol solution, or fluorine compound solutions. The millimeter-wave irradiation makes it possible to form magnets on a substrate, which is not molten by the millimeter-wave heating. The process can be applied to a magnet having a shape, which is not machined.

The fluorine compound magnet may contain oxygen, carbon, nitrogen, boron, etc, which give little influence on magnetic properties.

The gelatinous or sol fluorine compound was inserted into patterns prepared by a resist mask, etc, followed by drying and heat-treatment at a temperature lower than a heat-resistant temperature of the resist. After removing the resist, the particles were heated to increase the coercive force.

The gelatinous or sol fluorine compound could be injected into or coated in spaces of resist patterns having a width of 10 nm or more and a thickness of magnet portion of 1 nm or more. Thus, a three dimensional magnet could be prepared without machining, or physical processes such as evaporation, sputtering, etc. The Fe-M-F magnet can absorb only light having a specific wavelength. Accordingly, the fluorine compound can be used as optical components, or parts for optical recording devices, or as a surface treating agent.

As the fluorine compounds there are R2Fe17F2-3 (R: Li, Mg, Ca, Sc, V, Mn, Co, Ni, Zn, Al, Ga, Sr, Y, Zr, Nb, Ag, In, Sn, Ba, Ce, Pr, Nd, Sm, Eu, Gd, Tb, Ho, Er, Tm, Yb, Lu, Pb) or an oxygen containing fluorine compound, carbon containing compounds that are formed by a surface treating the above fluorine compounds with a solution containing oxygen or carbon. Using the fluorine compounds, magnets having a coercive force of 10 to 30 Oe are obtained.

Embodiment 16

Particles of NdFeB having a particle size of 10 nm and containing at least one rare earth elements were added to a gelatinous or sol fluorine compound of $GdF_3$. The particles contain $Nd_2Fe_{14}B$ as a main component. The mixture was coated on the surface of the particles. As a parameter for coating conditions, a mixing ratio of the fluorine compound and the particles was changed to change a covering rate of the particles. When the covering rate is 5%, an increase in coercive force by the fluorine compound was recognized, and when the covering rate is 30%, an increase in rectangularity of demagnetization curve or Hk in addition to the increase in the coercive force was recognized. When the covering rate is 80%, an increase in resistance of a molding was recognized. In the above, the covering rate is a rate of an area of a coating material (fluorine compound) covering the particles per a surface area of the particles.

Particles whose covering rate is 1 to 10% were pre-molded in a magnetic field, and the molding was heat-molded at 800° C. or higher to produce a sintered magnet. The gelatinous or sol fluorine compound contains at least one rare earth element. Since the fluorine compound is a gelatinous or sol solution, it was coated along the grain boundaries. Even if there are uneven faces on the particles, the solution can be coated along the shapes of the surface.

The rare earth elements of the fluorine compound diffuse along the grain boundaries of the particles during the heat-treatment after pre-molding in the magnetic field. As a result, a coercive force was increased compared to the case where no coating was formed on the particles.

When the gelatinous or sol fluorine compound is coated on Fe group particles, exposed Fe particles wherein no coating is formed becomes fluoride. Accordingly, since 90% of the surface of the Fe particles is exposed, the exposed surface is changed to fluoride so that magnetic properties at the grain boundaries change and resistance of the surface increases.

Since the rare earth elements easily react with fluorine to form a fluoride, the surface of the particles change into the fluoride when the particles are coated with the solution if a concentration of rare earth elements is high. If the particles with a high resistance are sintered, rare earth elements in the inside of the particles react with fluorine in the surface thereof to segregate rare earth elements in the vicinity of the grain boundaries, thereby increasing the coercive force. Fluorine works as a trapping agent, and it suppresses diffusion of the rare earth element (Nd) in the particles to thereby segregate the rare earth elements in the grain boundaries to increase the coercive force and lower a concentration of the rare earth elements (Nd) in the particles, which leads to a high residual magnetic flux density.

Embodiment 17

Particles of rare earth elements such as $Nd_2Fe_{14}B$ as a main phase having a particle size of 1 to 10000 nm and containing at least one rare earth elements were added to a gelatinous or sol fluorine compound solution. The particles or fine magnets contain $Nd_2Fe_{14}B$ as a main component. The gelatinous or sol fluorine compound solution contacts with the surfaces of the particles. The fluorine compound adhered to the surfaces of the particles was removed with a solvent. An amount of the fluorine compound remaining on the surface of the particles should be as small as possible, preferably 10% or less on an average coverage rate. Accordingly, 90% or more of the surface of the particles is exposed. This was confirmed by observation with a scanning electron microscope at 10000 magnitudes. In a part of the surface, part of the rare earth element was changed to fluoride, which is rich in fluorine. Rare earth elements tend to react easily with fluorine to form a fluoride, but if the rare earth elements (Nd) do not exist, the reaction for forming fluoride is hard to occur.

In case where a part of the rare earth elements (Nd) forms a fluoride, a layer of fluoride of rare earth elements is formed on the surface of the particles. Since the rare earth elements easily react with oxygen, oxy-fluorine compound may be formed besides the fluoride.

The particles with the fluoride layer were press-molded in a magnetic field, followed by sintering to form anisotropic sintered magnet.

The resulting molding having a density of 50 to 90% was impregnated with the above-mentioned fluorine solution. The surface of the particles can be covered with a precursor of the fluorine compound. With the impregnation treatment, the fluorine compound having a thickness of 1 to 100 nm was formed on the particles to cover the surface and cracks. This structure contributes to any of increases in coercive force, rectangularity and resistance and a decrease in residual magnetic flux density, reduction of an amount of rare earth elements used, an increase in strength, and imparting anisotropy to the magnetic powder.

Sintering accompanies diffusion of fluorine atoms and rare earth elements. The larger the additive amount of heavy rare earth elements, the larger the coercive force becomes by virtue of forming the fluoride, compared to a case where the fluoride is not formed. A concentration of the heavy rare earth elements can be reduced by forming the fluoride thereby to obtain the same coercive force. The heavy rare earth elements tend to segregate in the vicinity of fluoride phase so that a structure where the heavy rare earth elements segregated to increase the coercive force. A width of the segregation is about 1 to 100 nm from the grain boundaries.

Embodiment 18

A fluorine compound solution of GdF3 a main phase, Gd(O,F)and Gd(O,F,C) was coated on oxide powder $BaFe_{t2}Co_{0.5}Ti_{0.1}O_{19}$ and having a particle size of 10 nm; then the powder was heated at 1200° C. and irradiated with a millimeter-wave. An oxy-fluorine compound $(Gd,Fe)_xO_yF_z$ (x,y,z: integers) was partially formed on the surface of the particles at the time of heating. As the fluorine compound solution containing at least one rare earth element, formation of oxy-fluorine compound or fluorine compound improved magnetic properties of barium ferrite oxide or strontium ferrite oxide. An increase in the coercive force, rectangularity of demagnetization curve and residual magnetic flux density were confirmed. Particularly, if a fluorine compound solution containing lat% of Fe was used, an effect of increase in the residual magnetic flux density was remarkable. The oxide powder treated with the fluorine compound can be prepared by a sol-gel process.

Embodiment 19

10 atomic % Fe was added to a gelatinous or sol state fluorine compound solution of GdF3 or a solution containing oxygen or carbon to prepare a gelatinous or sol Co- or Ni-fluorine compound solution wherein Fe ions cluster are mixed. Part of Fe atoms reacts with Gd or fluorine atoms or alkali metals, alkaline earth metals or rare earth elements that constitute the fluorine compound.

When the gelatinous or sol fluorine compound or its precursor is irradiated with a millimeter-wave or microwave to dry the compound so that the number of atoms that contribute to chemical bond among fluorine atoms, Fe atoms and at least one rare earth elements increases to form ternary or more fluorine compounds. By irradiation with the millimeter-wave or microwave, it is possible to prepare a fluorine compound having a coercive force of 10 kOe or more. A part of Fe ions may be substituted by rare earth element ions. It is possible to obtain magnetic powder without dissolution and crushing steps according to the above method. Accordingly, this method can be applied to a magnetic circuit.

If M represents any of elements selected from alkali metals, alkaline earth metals and rare earth elements, Co-M-F group, Co-M-F group and Ni-M-F group magnets are produced from gelatinous or sol solution, or fluorine compound solutions. The millimeter-wave irradiation makes it possible to form magnets on a substrate, which is not molten by the millimeter-wave heating. The process can be applied to a magnet having a shape, which is not machined.

The fluorine compound magnet may contain oxygen, carbon, nitrogen, boron, etc, which give little influence on magnetic properties.

Embodiment 20

Fine particles of Fe having a particle size of 1 to 100 nm was added to a gelatinous or sol fluorine compound of $GdF_3$ or a compound of $GdF_3$ containing oxygen or carbon to produce a gelatinous or sol Fe-fluorine compound. Fe atoms on the surface of the fine particles chemically bonded with Gd constituting the fluorine compound. Irradiation with the millimeter-wave or microwave to the gelatinous or sol fluorine compound containing the fine particles increases atoms of Gd that contribute to chemical bonding between fluorine atoms and Fe atoms or constituting elements for the fluorine compound. Fe atoms and Gd bond by means of fluorine atoms or bonds between fluorine atoms and oxygen atoms so that magnetization of Fe becomes ferromagnetic.

Irradiation with a millimeter-wave or microwave produces a structure that is useful for the ferromagnetic bonds thereby producing fluorine compound containing Fe having a coercive force of 10 kOe. In place of Fe group fine powder, fine powder of other transition metals may be added. That is, in case of transition metals such as Cr, Mn, V, etc other than Co and Ni, the above method can be employed. Therefore, permanent magnet materials can be produced without dissolution and crushing; the method can be applied to a magnetic circuit, accordingly.

Embodiment 21

Fine particles of Fe having a particle size of 1 to 100 nm was added to a gelatinous or sol fluorine compound of $GdF_3$ or the compound containing oxygen or carbon to produce a gelatinous or sol Fe-fluorine compound. Fe atoms on the surface of the fine particles chemically bonded with Gd that constitute the fluorine compound. Irradiation with the millimeter-wave or microwave to the gelatinous or sol fluorine compound containing the fine particles increases atoms that contribute to chemical bonding between fluorine atoms and Fe atoms or constituting elements for the fluorine compound.

Fe atoms and rare earth elements bond by means of fluorine atoms or bonds between fluorine atoms and oxygen atoms so that magnetization of Fe becomes ferromagnetic and exhibits magnetic anisotropy.

A fluorine rich phase (F: 10 to 50%), a Fe rich phase (Fe: 50 to 85%) and a rare earth element rich phase (rare earth element: 20 to 75%) are formed in the fine powder. The Fe rich phase bears magnetization, the fluorine rich phase or rare earth element rich phase bears high coercive force. Magnetization of part of Fe atoms takes anti-ferromagnetic bonds.

Irradiation with a millimeter-wave or microwave produces a structure that is useful for the ferromagnetic bonds thereby producing fluorine compound containing Fe having a coercive force of 10 kOe. In place of Fe group fine powder, fine powder of other transition metals may be added. Therefore, permanent magnet materials can be produced without dissolution and crushing; the method can be applied to a magnetic circuit, accordingly.

Embodiment 22

A gelatinous or sol fluorine-rare earth element compound was coated on the NdFeB sintered magnet whose main component was $Nd_2Fe_{14}B$. An average thickness of the fluorine-rare earth element compound coating of $DyF_2$ was 5 nm. A crystal grain size of the NdFeB sintered magnet had 5 μm on average and its main component is $Nd_2Fe_{14}B$. Deterioration of magnetic properties in demagnetization curve due to surface machining or polishing was observed in the surface of the sintered magnet. In order to improve the deteriorated magnetic properties, increase a coercive force by segregation of rare earth elements in the vicinity of grain boundaries, rectangularity of demagnetization curve, resistance in the surface of the magnet or in the vicinity of grain boundaries, a Curie point by the fluorine compound and mechanical strength, improve anti-corrosion, reduce an amount of rare earth element used and reduce magnetization field, etc, the gelatinous or sol rare earth element-fluorine compound solution of $DyF_2$ was coated on the sintered magnet and dried. The magnet was heat-treated at 500° C. or higher but lower than the sintering temperature.

The gelatinous or sol like rare earth element-fluorine compound particles grow to 1 to 100 nm grains immediately after coating and drying. A further heating brings about reaction or diffusion between grains of the sintered magnet and the surface. The gelatinous or sol rare earth element-fluorine compound powder grew to particles of 1 to 100 nm, immediately after coating and drying. When the particles were heated further, reaction and diffusion took place in the grain boundaries and surfaces.

Since the fluorine compound particles after coating and drying were not subjected to a crushing process, projections or keen corners were not found in the surface. When the particles were observed with a transmission electron microscope, the particles were egg like or spherical, but cracks were not found. When heated, they agglomerated and grew, and at the same time, the particles diffused along the grain boundaries or mutually diffused with the constituting components of the sintered magnet. Further, because the gelatinous or sol rare earth element-fluorine compound was coated on the magnet with the sintered magnet, almost entire of the surface of the magnet was covered with the coating. Therefore, before the coating is heated at 500° C. or higher but lower than the sintering temperature, part of the particles where a concentration of rare earth element of the sintered magnet was high turned into fluoride.

The fluoride phase or fluoride phase containing oxygen grew in harmony with the mother phase. The fluorine compound phase or oxy-fluorine compound phase grew outside the fluoride mother phase or oxy-fluoride mother phase, wherein heavy rare earth elements segregated in these phases to increase coercive force.

A belt like portion wherein the heavy rare earth elements are concentrated should preferably have a width of 1 to 100 nm. This width satisfied the high residual magnetic flux density and high coercive force. If Dy was concentrated along the grain boundaries by the above method, the resulting sintered magnet had a residual magnetic flux density of 1.0 to 1.6T and a coercive force of 20 to 50 kOe.

The concentration of the heavy rare earth elements in the sintered magnet of this embodiment was lower than that of a conventional magnet that used NdFeB powder containing added heavy rare earth elements, which is equivalent to the magnet of this embodiment.

A concentration of Fe in the fluorine compound of the sintered magnet changed in accordance with heat-treatment temperature; when heated at 1000° C. or higher, Fe of 10 ppm to 5% diffused into the fluorine compound. Though the concentration of fluorine in the vicinity of the grain boundaries became 50%, the concentration hardly affects on magnetic properties of the sintered magnet as long as the concentration is 1 to 5%.

Embodiment 23

Fine particles of Fe having a particle size of 100 nm on average was added to a gelatinous or sol fluorine compound of $SmF_3$ to produce a gelatinous or sol Fe fine particle containing fluorine compound.

Part of Fe atoms on the surface of the fine particles chemically bonded with any of alkali metals, alkaline earth metals, or rare earth elements that constitute the fluorine compound. Irradiation with the millimeter-wave or microwave to the gelatinous or sol fluorine compound containing the fine particles or its precursor increases atoms that contribute to chemical bonding between fluorine atoms $SmF_2$ and Fe atoms or constituting elements for the fluorine compound. Fe atoms and rare earth elements bond by means of fluorine atoms or bonds between fluorine atoms and oxygen atoms so that magnetization of Fe becomes ferromagnetic and exhibits magnetic anisotropy.

A fluorine rich phase (F: 10 to 50%), a nitrogen rich phase (N: 3 to 20%), a Fe rich phase (Fe: 50 to 85%) and a rare earth element rich phase (rare earth element: 10 to 75%) are formed in the fine powder. The Fe rich phase bears magnetization, the fluorine rich phase or rare earth element rich phase bears high coercive force. It is possible to produce a magnet having a coercive force of 10 kOe or more from the four elements Fe-M-F-N (M: rare earth element, alkali metal or alkaline earth metal).

Embodiment 24

Fine particles of Fe-5% B alloy having a particle size of 100 nm was added to a gelatinous or sol fluorine compound of $NdF_2$ or a compound of $NdF_2$ containing oxygen or carbon to produce a gelatinous or sol Fe-fluorine compound containing Fe-B fine powder.

If the particle size of the fine powder exceeds 100 nm, magnetic properties inherent to Fe, which is a soft magnetic material, remain after the processing, and if the particle size is 1 nm or less, a concentration of oxygen with respect to Fe becomes high so that improvement of magnetic properties becomes difficult. Accordingly, a particle size of 1 to 100 nm is preferable.

Part of Fe atoms on the surface of the Fe-B fine particles chemically bonded with any of alkali metals, alkaline earth metals, or rare earth elements that constitute the fluorine compound. Irradiation with the millimeter-wave or microwave to the gelatinous or sol fluorine compound containing the Fe-B fine particles or its precursor increases atoms that contribute to chemical bonding between fluorine atoms and Fe atoms or constituting elements for the fluorine compound. Fe atoms and rare earth elements bond by means of fluorine atoms. Bonding among fluorine atoms, boron atoms, Fe atoms, rare earth elements, or bonding of rare earth elements to fluorine, oxygen atoms, boron atoms and Fe atoms makes magnetization of fluorine rich phase ferromagnetic to exhibit magnetic anisotropy.

A fluorine rich phase (F: 10 to 50%), a boron rich phase (B: 3 to 20%), a Fe rich phase (Fe: 50 to 85%) and a rare earth element rich phase (rare earth element: 10 to 75%) are formed in the fine powder. The Fe rich phase bears magnetization, the fluorine rich phase, boron rich phase or rare earth element rich phase bears high coercive force. It is possible to produce a magnet having a coercive force of 10 kOe or more from the four elements Fe-M-B-F (M: rare earth element, alkali metal or alkaline earth metal). Because M is a heavy rare earth element, a Curie point becomes 400 to 600° C.

Embodiment 25

A gelatinous or sol fluorine-rare earth element compound or its precursor that is capable of growing to rare earth element-fluorine compound was coated on the NdFeB sintered magnet whose main component was $Nd_2Fe_{14}B$. An average thickness of the fluorine-rare earth element compound coating was 1 to 10000 nm. A crystal grain size of the NdFeB sintered magnet had 1 to 20 μm on average and its main component is $Nd_2Fe_{14}B$. Deterioration of magnetic properties in demagnetization curve due to surface machining or polishing was observed in the surface of the sintered magnet. In order to improve the deteriorated magnetic properties, increase a coercive force by segregation of rare earth elements in the vicinity of grain boundaries, rectangularity of demagnetization curve, resistance in the surface of the magnet or in the vicinity of grain boundaries, a Curie point by the fluorine compound and mechanical strength, improve anti-corrosion, reduce an amount of rare earth element used and reduce magnetization field, etc, the gelatinous or sol rare earth element-fluorine compound solution was coated on the sintered magnet and dried. The magnet was heat-treated at 500° C. or higher but lower than the sintering temperature.

The gelatinous or sol like rare earth element-fluorine compound particles grow to 1 to 100 nm grains immediately after coating and drying. A further heating brings about reaction or diffusion between grains of the sintered magnet and the surface.

Particles of the fluorine compound powder after coating and drying have no projections or keen angle portions if the temperature is within a range where the particles do not agglomerate, because the particles are not subjected to a crushing process. When the particles are observed with a transmission electron microscope, they are round, egg like form or spherical, and cracks or non-continuous unevenness in the inside of the particles or the surface thereof. When the particles are heat treated, these particles agglomerate on the surface of the sintered magnet, and at the same time, they diffuse along the grain boundaries or mutually diffuse with constituting elements of the sintered magnet.

Further, because the gelatinous or sol rare earth element-fluorine compound was coated on the magnet with the sintered magnet, almost entire of the surface of the magnet was covered with the coating. After coating and drying the coating, part of the surface of the particles of the sintered magnet where a concentration of rare earth elements is high became fluoride.

The fluoride phase or fluoride phase containing oxygen grew in harmony with the mother phase. The fluorine compound phase or oxy-fluorine compound phase grew outside the fluoride mother phase or oxy-fluoride mother phase, wherein heavy rare earth elements segregated in these phases to increase coercive force.

A belt like portion wherein the heavy rare earth elements are concentrated should preferably have a width of 0.1 to 100 nm. This width satisfied the high residual magnetic flux density and high coercive force.

Using a precursor of $DyF_{2-3}$, Dy was concentrated along the grain boundaries in accordance with the above method. The resulting sintered magnet had a residual magnetic flux density of 1.0 to 1.6T and a coercive force of 20 to 50 kOe.

The concentration of the heavy rare earth elements in the sintered magnet of this embodiment was lower than that of a conventional magnet that used NdFeB powder containing added heavy rare earth elements, which is equivalent to the magnet of this embodiment.

A concentration of Fe in the fluorine compound of the sintered magnet changed in accordance with heat-treatment temperature; when heated at 1000° C. or higher, Fe of 10 ppm to 5% diffused into the fluorine compound. Though the concentration of fluorine in the vicinity of the grain boundaries became 50%, the concentration hardly affects on magnetic properties of the sintered magnet as long as the concentration is 5% or less.

Embodiment 26

$Sm_2(Fe_{0.9}Co_{0.1})_{17}$ alloy was melted by high frequency melting, etc and an ingot was crushed in inert gas. Crushed powder had a size of 1 to 10 μm. The powder was coated with a precursor of fluorine compound ($SmF_3$ precursor) and the coating was dried. The coated powder was oriented by a press machine in a magnetic field to produce a compacted molding. Many cracks were introduced into powder of the compacted molding. The precursor was impregnated in the compacted molding to cover part of the cracks with the precursor. The resulting body was sintered and quenched.

The sintered body comprised at least two phases of $Sm(Fe_{0.9}Co_{0.1})_5$ and $Sm_2(Fe_{0.9}Co_{0.1})_{17}$. The fluorine compound began to be decomposed at the time of sintering, and fluorine atoms distributed more in the $Sm(Fe_{0.9}Co_{0.1})_5$ phase, though they are present in both phases. The coercive force increased, compared to a case where no precursor was added. It was confirmed that coating of the fluorine compound precursor improved at least one of high resistance, rectangularity, and demagnetization withstanding.

Embodiment 27

Powder having a main component close to $Nd_2Fe_{14}B$ and a particle size of 1 to 20 μm was pre-molded in a magnetic field in an inert gas atmosphere or in vacuum at 500 to 1000° C., and a fluorine compound precursor solution of $DyF_3$ was impregnated in or coated on the molding. The solution entered into the molding along the grain boundaries, part of the grain boundaries were covered with the precursor.

Then, the impregnated or coated molding was sintered at a temperature higher than the above temperature, and was subjected to heat treatment at a lower temperature to increase a coercive force. As a result, a sintered body containing fluorine, rare earth elements Dy, alkali metals or alkaline metals for constituting the precursor was obtained. A feature of this process is to form a rare earth element rich phase on part or entire of the surface of the magnetic powder, followed by forming gaps of 1 nm or larger between the magnetic powder except the contact points, without complete sintering, and to fill the gaps with the precursor of the fluorine compound of Dy by impregnation or coating. As a result, part of the magnetic powder in the molding is covered with the precursor of the fluorine compound.

According to this process, it is possible to coat the magnetic powder with the precursor even in the center portion of the sintered body having a size of 100 mm. By using heavy rare earth element such as Dy, Tb, etc, the heavy rare earth element was segregated in the vicinity of grain boundaries of the sintered body.

It was possible to improve coercive force, rectangularity and residual magnetic flux density, to reduce a temperature coefficient of coercive force and of residual magnetic flux density, or to reduce deterioration of magnetic properties caused by machining.

Segregation of the heavy rare earth element takes place within a range of 1 to 100 nm from the grain boundaries, and the width changes depending on heat treatment temperatures. The width tends to spread at a specific point such as grain boundary triple point.

Embodiment 28

A solution of gel, sol or precursor of an Fe fluorine compound of $FeF_2$ was mixed with a precursor of a fluorine compound $GdF_3$. The mixture was dried and heat-treated to obtain compounds represented by $Gd_2Fe_{17}F_{1-3}$.

Because the precursor was used, grains that grew during the drying and heat-treatment were as small as 1 to 30 nm. The fluorine compound grew in the nano-particles.

The fluorine compound material having a high coercive force can be produced by forming an M rich phase of 10 atomic % of Fe and 1 atomic % of F in the grain boundaries. Particularly, concentrations of Fe, and fluorine suitable for forming fluorine rich phase, Fe rich phase and Gd rich phase are 50 atomic % or more, 5 to 30% and 1 to 20%, respectively.

Forming the fluorine rich phase or M rich phase in the grain boundaries produces magnetic powder exhibiting ferromagnetism and having a coercive force of 10 kOe or more. When the fluorine compound grows in a magnetic field to impart anisotropy thereto, the Fe rich phase grows along the magnetic field. Even if hydrogen, oxygen, carbon, nitrogen and boron enters the phase during the growth process, there is no problem as long as the structure of the phase is maintained.

If Fe-M-F (M: at least one of transition metals such as Cr, Mn, etc), which has M atoms of 5 atomic % and F atoms of 5 atomic %, is grown from a solution containing gel, sol or a precursor of fluorine compound, a high coercive force is expected. Because the ternary magnet is produced from the solution, machining and polishing steps are not necessary. Therefore, magnets of complicated figures can be easily manufactured. It is possible to change directions of anisotropy in a magnet. The magnet is applicable to various rotating machines, magnetic sensors, magnet parts for hard discs, magnetic recording media, etc.

If a concentration of M is less than 5 atomic %, the ternary Fe-M-F alloy becomes high saturated magnetic flux density material, which is suitable for core materials for various magnetic circuits.

Embodiment 29

A rotor for an electric rotating machine was manufactured by bonding an NdFeB sintered magnet whose main component is $Nd_2Fe_{14}B$ to laminated electro-magnetic steel plates, laminated amorphous plates or compacted iron. The laminated electro-magnetic steel plates or compacted iron were shaped by a metal mold in advance. When a sintered magnet is inserted into positions into which magnets are inserted, a small gap of 0.01 to 0.5 mm was formed between the sintered magnet and the laminated electro-magnetic steel plates.

Sintered magnets having a rectangular form, ring-form or rod form were inserted into the portions, and the gaps were filled with a gelatinous or sol fluorine compound solution and heated at 100° C. or higher, thereby bonding the members. The members were further heated at 500° C. to diffuse rare earth element or fluorine into the surfaces of the magnets and of the electro-magnetic steel plates. As a result, magnetic properties (coercive force, rectangularity, anti-demagnetization, Curie point, etc) of the sintered magnets were improved.

It is possible to improve magnetic properties of machined magnets, which have transformed layers with curve faces by machining. A diffusion layer containing fluorine or rare earth elements in the surface and grain boundaries of the magnetic materials may contain light elements such as oxygen or carbon. In order to improve magnetic properties of the sintered magnets, the fluorine compound should contain rare earth elements. In order to improve bonding, stress relieving of the soft magnetic material or loss reduction, fluorine compounds that contain rare earth elements, alkali metals or alkaline earth metals should be used.

In some of the embodiments of the present invention, a layer having a higher resistance than the magnets is formed in part of grain boundaries. The high resistance layer contains Fe. It is possible to change re-coil permeability or other magnetic properties by controlling the Fe concentration. The magnets of the embodiments that meet magnetic circuits can be applied to magnet motors. The magnet motors are used in applications including driving motors for hybrid-cars, starters, power stealing systems.

What is claimed is:

1. A magnet composed of united particles of a ferromagnetic material whose main component is iron, each of the particles comprising the ferromagnetic material and a layer of a fluorine compound of at least one member selected from the group consisting of alkali metals, alkaline earth metals and transition metals, coated on surfaces of the particles, wherein the layer of the fluorine compound contains iron in a range of from 1 to 50 atomic %, and the fluorine compound has a face-centered cubic crystal structure.

2. The magnet according to claim 1, wherein the face-centered cubic crystal structure has a lattice constant of 0.54 to 0.60 nm.

3. The magnet according to claim 1, wherein the ferromagnetic material comprises a fluorine-rich phase, an iron-rich phase and a rare earth-rich phase.

4. The magnet according to claim 1, wherein the fluorine compound is one of a fluoride, an oxy-fluoride and a mixture thereof.

5. The magnet according to claim 1, wherein the ferromagnetic material is represented by R-Fe-B, wherein R is a rare earth metal, Fe is iron, and B is boron.

6. The magnet according to claim 1, wherein the fluorine compound is at least one member selected from the group consisting of NdF$_3$LiF, MgF$_2$, CaF$_2$, ScF$_2$, VF$_2$, VF$_3$, CrF$_2$, CrF$_3$, MnF$_2$, MnF$_3$, CoF$_2$, CoF$_3$, NiF$_2$, ZnF$_2$, AlF$_3$, GaF$_3$, SrF$_3$, YF$_3$, ZrF$_3$, NbF$_5$, AgF, InF$_3$, SnF$_2$, SnF$_4$, BaF$_2$, LaF$_2$, LaF$_3$, CeF$_3$, PrF$_3$, NdF$_2$, SmF$_2$, SmF$_3$, EuF$_2$, EuF$_3$, GdF$_3$, TbF$_3$, TbF$_4$, DyF$_2$, DyF$_3$, HoF$_2$, HoF$_3$, ErF$_2$, ErF$_3$, TmF$_2$, TmF$_3$, YbF$_2$, YbF$_3$, LuF$_2$, LuF$_3$, PbF$_2$, and BiF$_3$.

7. The magnet according to claim 1, wherein the fluorine compound has a particle size of 1 to 500 nm.

8. The magnet according to claim 1, wherein the fluorine compound has a higher electric resistance than that of the particles of the ferromagnetic material.

9. The magnet according to claim 1, wherein the magnet has a recoil magnetic permeability of 1.04 to 1.30.

10. The magnet according to claim 1, wherein the specific resistance is 0.2mΩcm or more.

11. The magnet according to claim 1, wherein the oxy-fluorine compound is represented by Rw(OxFy)z wherein w,x,y and z are integers and R is at least one member selected from the group consisting of Li, Mg, Ca, Sc, Mn, Co, Ni, Zn, Al, Ga, Sr, Y, Zr, Nb, Ag, In, Sn, Ba, La, Pr, Nd, Sm, Eu, Gd, Tb, Dy, Ho, Er, Tm, Yb, Lu, Pb and Bi.

12. The magnet according to claim 1, wherein a particle size of the particles is 1 to 300 μm.

13. The magnet according to claim 1, wherein the layer of fluorine compound is formed between NdFeB system particles and Fe particles.

14. A magnet composed of united particles of a ferromagnetic material whose main component is iron, each of the particles comprising the ferromagnetic material and a layer of a fluorine compound of at least one member selected from the group consisting of alkali metals, alkaline earth metals and transition metals, coated on surfaces of the particles, wherein the fluorine compound has a face-centered cubic crystal structure wherein the layer of the fluorine compound comprises iron in an amount of 50 atomic % or more, at least one member selected from the group consisting of alkali metals, alkaline earth metals and transition metals in an amount of 5 to 30% atomic % and fluorine in an amount of 1 to 20% atomic %.

15. The magnet according to claim 14, wherein the face-centered cubic crystal structure has a lattice constant of 0.54 to 0.60 nm.

16. The magnet according to claim 14, wherein the ferromagnetic material comprises fluorine-rich phase, an iron-rich phase and a rare earth-rich phase.

17. The magnet according to claim 14, wherein the fluorine compound is one of a fluoride, an oxy-fluoride and a mixture thereof.

18. The magnet according to claim 14, wherein the ferromagnetic material is represented by R-Fe-B, wherein R is a rare earth metal, Fe is iron, and B is boron.

19. The magnet according to claim 14, wherein the fluorine compound has a higher electric resistance than that of the particles of the ferromagnetic material.

20. The magnet according to claim 14, wherein the magnet has a recoil magnetic permeability of 1.04 to 1.30.

21. The magnet according to claim 14, wherein the specific resistance is 0.2mΩcm or more.

22. The magnet according to claim 14, wherein a particle size of the particles is 1 to 300 μm.

23. A magnet composed of united particles of a ferromagnetic material whose main component is iron, each of the particles comprising the ferromagnetic material and a layer of a fluorine compound of at least one member selected from the group consisting of alkali metals, alkaline earth metals and transition metals, wherein the particles comprise the iron in an amount of 50 atomic % or more, said at least one member in an amount of 5 to 30 atomic % and the fluorine in an amount of 1 to 20 atomic %.

24. The magnet according to claim 23, wherein the particles contain atoms of hydrogen, oxygen, carbon, nitrogen and boron.

25. The magnet according to claim 23, wherein a particle size of the particles is 1 to 300 μm.

* * * * *